United States Patent
Guey et al.

(10) Patent No.: US 9,014,070 B2
(45) Date of Patent: Apr. 21, 2015

(54) ENERGY EFFICIENT OPERATION FOR DENSE DEPLOYMENT OF WIRELESS ACCESS NODES

(75) Inventors: Jiann-Ching Guey, Fremont, CA (US); Kumar Balachandran, Pleasanton, CA (US); Dennis Hui, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 372 days.

(21) Appl. No.: 13/302,767

(22) Filed: Nov. 22, 2011

(65) Prior Publication Data

US 2013/0128785 A1    May 23, 2013

(51) Int. Cl.
*H04W 52/02* (2009.01)
*H04W 76/04* (2009.01)

(52) U.S. Cl.
CPC ........ *H04W 52/0206* (2013.01); *H04W 76/048* (2013.01); *Y02B 60/50* (2013.01)

(58) Field of Classification Search
CPC .................. H04W 76/048; H04W 52/0206
USPC .................................................. 370/311, 328
See application file for complete search history.

(56) References Cited

U.S. PATENT DOCUMENTS

| | | | | |
|---|---|---|---|---|
| 8,520,575 | B2 * | 8/2013 | Doppler et al. | 370/310 |
| 8,576,760 | B2 * | 11/2013 | Gorokhov et al. | 370/311 |
| 2010/0048209 | A1 | 2/2010 | Aoyama et al. | |
| 2010/0067421 | A1 | 3/2010 | Gorokhov et al. | |
| 2011/0051640 | A1 | 3/2011 | Ramesh et al. | |
| 2011/0170420 | A1 | 7/2011 | Xi et al. | |
| 2012/0115471 | A1 | 5/2012 | Awoniyi et al. | |

FOREIGN PATENT DOCUMENTS

| | | |
|---|---|---|
| EP | 2362697 A1 | 8/2011 |
| WO | 2011025295 A2 | 3/2011 |
| WO | 2011055437 A1 | 5/2011 |

OTHER PUBLICATIONS

Olsson et al., "SAE and the evolved packet core: driving the mobile broadband revolution," Academic Press, First Edition, Oct. 7, 2009, pp. 29-31, http://www.3gpp.org/ftp/Specs/html-info/36305.htm.

(Continued)

*Primary Examiner* — Ricky Ngo
*Assistant Examiner* — Ben H Liu
(74) *Attorney, Agent, or Firm* — Withrow & Terranova, PLLC

(57) ABSTRACT

Systems and methods are disclosed for providing energy efficient operation for wireless access nodes in a dense deployment of wireless access nodes in a cellular communication network. In one particular embodiment, wireless access nodes form a super dense network. In one embodiment, a wireless access node in a dense deployment of wireless access nodes in a cellular communication network includes a transmitter and a receiver that are operated according to a discontinuous transmit and a discontinuous receive mode of operation. The wireless access node controls one or more duty cycles for the discontinuous transmit and discontinuous receive mode of operation based on an alertness state of the wireless access node. In one embodiment, the one or more duty cycles increase as the alertness state of the wireless access node increases. In this manner, the wireless access node is operated in an energy efficient manner.

18 Claims, 23 Drawing Sheets

(56) References Cited

OTHER PUBLICATIONS

3GPP TS 36.355, "3rd Generation Partnership Project; Technical Specification Group Radio Access Network; Evolved Universal Terrestrial Radio Access Network (E-UTRAN); LTE Positioning Protocol (LPP) (Release 10)," V10.2.0., Nov. 2006, 114 pages.

3GPP TS 36.305, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10)," V 10.2.0., Nov. 2006, 51 pages.

International Search Report and Written Opinion for PCT/IB2012/056550, mailed Aug. 12, 2013, 15 pages.

International Preliminary Report on Patentability for PCT/IB2012/056550 mailed Feb. 7, 2014, 9 pages.

International Search Report and Written Opinion for PCT/IB2013/058678 mailed Feb. 10, 2014, 10 pages.

Non-Final Office Action for U.S. Appl. No. 13/627,009, mailed Dec. 26, 2014, 11 pages.

\* cited by examiner

ENERGY EFFICIENT OPERATION FOR DENSE DEPLOYMENT OF WIRELESS ACCESS NODES

FIELD OF THE DISCLOSURE

The present disclosure relates to cellular communication networks, and more particularly relates to wireless access nodes in a dense deployment of wireless access nodes in a cellular communication network.

BACKGROUND

In conventional cellular communication networks, a coverage area, or cell, of each base station, or wireless access node, typically covers a large geographic area serving hundreds of user equipment devices (UEs). At any given moment, tens of those UEs may be actively receiving or transmitting data. However, these conventional cellular communication networks are struggling to meet, and in some cases are unable to meet, demands placed on them by the increasing number of mobile broadband subscribers and the ever increasing demand for higher data rates. One viable solution, and possibly the only viable solution, to meet these demands is deploying more base stations.

Recently, a super dense network has been proposed as an architecture for increasing the density of base stations in a cellular communication network. As used herein, a super dense network is a wireless access node deployment wherein on average each wireless access node serves less than one active UE. Because of the low user activity per wireless access node, inter-cell interference is substantially less than that in conventional cellular communication networks and can therefore be more effectively managed. However, low user activity also implies under utilization of the wireless access nodes, which is a scenario unforeseen in the design of conventional cellular communication networks. This under utilization of the wireless access nodes results in excess power consumption by the wireless access nodes. As such, there is a need for systems and methods for energy efficient operation for wireless access nodes in a super dense network.

SUMMARY

Systems and methods are disclosed for providing energy efficient operation for wireless access nodes in a dense deployment of wireless access nodes in a cellular communication network. In one particular embodiment, wireless access nodes form a super dense network. In one embodiment, a wireless access node in a dense deployment of wireless access nodes in a cellular communication network includes a transmitter and a receiver that are operated according to a discontinuous transmit and a discontinuous receive mode of operation. The wireless access node controls one or more duty cycles for the discontinuous transmit and discontinuous receive mode of operation based on an alertness state of the wireless access node. In one embodiment, the one or more duty cycles for the discontinuous transmit and discontinuous receive mode of operation increase as the alertness state of the wireless access node increases. In this manner, the wireless access node is operated in an energy efficient manner.

In one embodiment, one or more duty cycles for the discontinuous transmit and discontinuous receive mode of operation controlled based on the alertness state of the wireless access node are a common duty cycle for both active transmit intervals and active receive intervals for the discontinuous transmit and discontinuous receive mode of operation. In another embodiment, the one or more duty cycles for the discontinuous transmit and discontinuous receive mode of operation are a duty cycle for either active transmit intervals or active receive intervals for the discontinuous transmit and discontinuous receive mode of operation. In yet another embodiment, the one or more duty cycles for the discontinuous transmit and discontinuous receive mode of operation are a duty cycle for the active transmit intervals for the discontinuous transmit and discontinuous receive mode of operation and a duty cycle for the active receive intervals for the discontinuous transmit and discontinuous receive mode of operation, where the duty cycles for the active transmit intervals and the active receive intervals are independently controlled and may not be equal.

In another embodiment, a wireless access node in a dense deployment of wireless access nodes in a cellular communication network includes a transmitter and a receiver that are operated according to a discontinuous transmit and a discontinuous receive mode of operation that defines active transmit intervals and active receive intervals, which may be arranged in numerous discontinuous transmit and discontinuous receive cycles. The wireless access node controls one or more duty cycles for the discontinuous transmit and discontinuous receive mode of operation based on an alertness state of the wireless access node. At least a subset of the active transmit intervals and the active receive intervals are time-aligned with corresponding active receive intervals and active transmit intervals of a user equipment device located within a cell served by the wireless access node.

Again, in one embodiment, the one or more duty cycles for the discontinuous transmit and discontinuous receive mode of operation controlled based on the alertness state of the wireless access node are a common duty cycle for both active transmit intervals and active receive intervals for the discontinuous transmit and discontinuous receive mode of operation. In another embodiment, the one or more duty cycles for the discontinuous transmit and discontinuous receive mode of operation are a duty cycle for either active transmit intervals or active receive intervals for the discontinuous transmit and discontinuous receive mode of operation. In yet another embodiment, the at least one duty cycle for the discontinuous transmit and discontinuous receive mode of operation are a duty cycle for the active transmit intervals and a duty cycle for the active receive intervals for the discontinuous transmit and discontinuous receive mode of operation, where the duty cycles for the active transmit intervals and the active receive intervals may not be equal.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
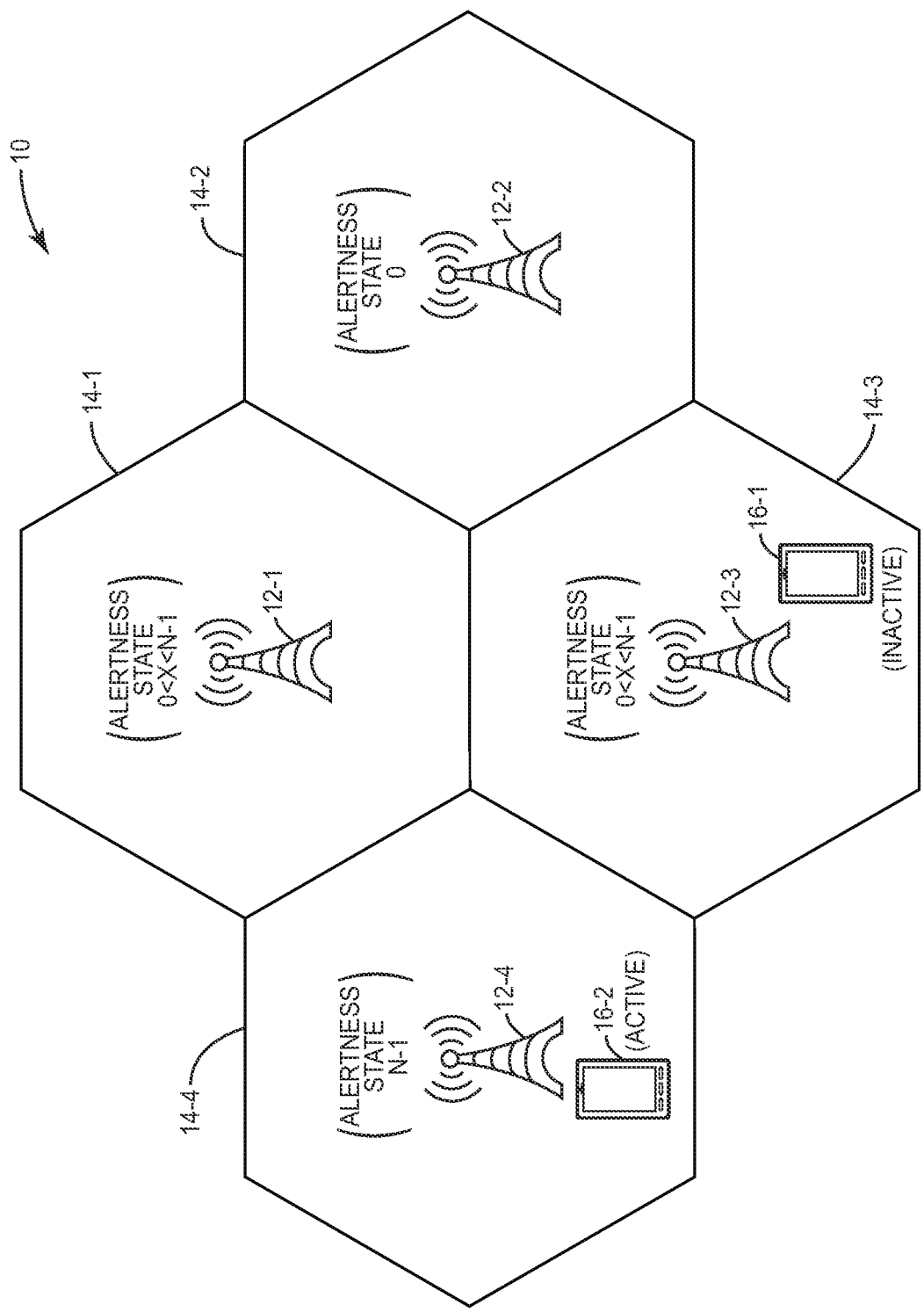
FIG. 1 illustrates a super dense network including energy efficient wireless access nodes according to one embodiment of the present disclosure.

FIG. 1 illustrates a super dense network 10 including a number of wireless access nodes 12-1 through 12-4 (generally referred to herein collectively as wireless access nodes 12 and individually as wireless access node 12) operating in an energy efficient manner according to one embodiment of the present disclosure. As used herein, the super dense network 10 is a cellular communication network or a portion of a cellular communication network where the wireless access nodes 12 forming the super dense network 10 serve on average less than one active user equipment device (UE) at a time. Note however that the concepts disclosed herein are not limited to the super dense network 10 and are applicable to any dense deployment of wireless access nodes 12 in a cellular communication network.

The wireless access nodes 12 are generally low-power wireless access nodes, which may also be referred to as micro access nodes or micro base stations, that serve UEs located in corresponding cells 14-1 through 14-4 (generally referred to herein collectively as cells 14 and individually as cell 14). In the illustrated example, there are two UEs 16-1 and 16-2 (generally referred to herein collectively as UEs 16 and individually as UE 16). Note that while FIG. 1 illustrates four wireless access nodes 12 and two UEs 16 for clarity and ease of discussion, it should be understood that the super dense network 10 may include any number of wireless access nodes 12 and UEs 16. Further, while in this example the cells 14 in the super dense network 10 are contiguous, the super dense network 10 is not limited thereto. Specifically, the super dense network 10 may include any type of arrangement of wireless access nodes 12 which may result in multiple distributed blocks of contiguous cells 14 and potentially some cells 14 that are not contiguous with any other cell 14.

As discussed below in detail, the wireless access nodes 12 and the UEs 16 operate in a discontinuous transmit and discontinuous receive (DTX/DRX) mode of operation. One or more duty cycles for the DTX/DRX mode of operation of each of the wireless access nodes 12 are controlled based on an alertness state of that wireless access node 12. Much of this disclosure focuses on embodiments where there is a common duty cycle for both DTX active intervals and DRX active intervals for the DTX/DRX mode of operation. However, alternatively, a duty cycle for the DTX active intervals and a duty cycle for the DRX active intervals may be separately controlled and may not be equal. Similarly, one or more duty cycles for the DTX/DRX mode of operation of each of the UEs 16 are controlled based on an alertness state of that UE 16. In general, the duty cycle(s) for the DTX/DRX mode of operation increase(s) with the alertness state. In this manner, energy efficiency is substantially improved.

Figure 2A:
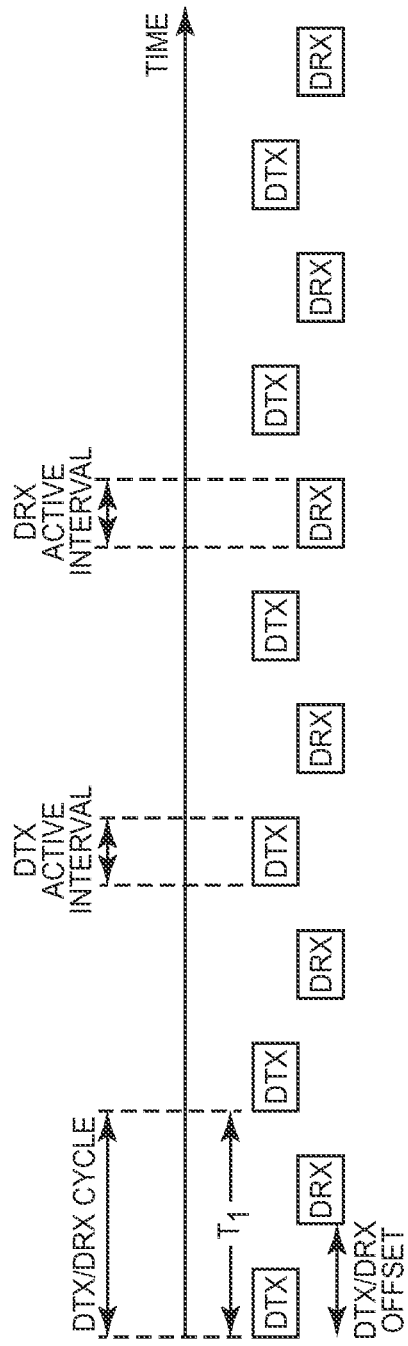
FIGS. 2A and 2B illustrate exemplary discontinuous transmit and discontinuous receive (DTX/DRX) cycles for two different DTX/DRX duty cycles according to one embodiment of the present disclosure.
Figure 2B:
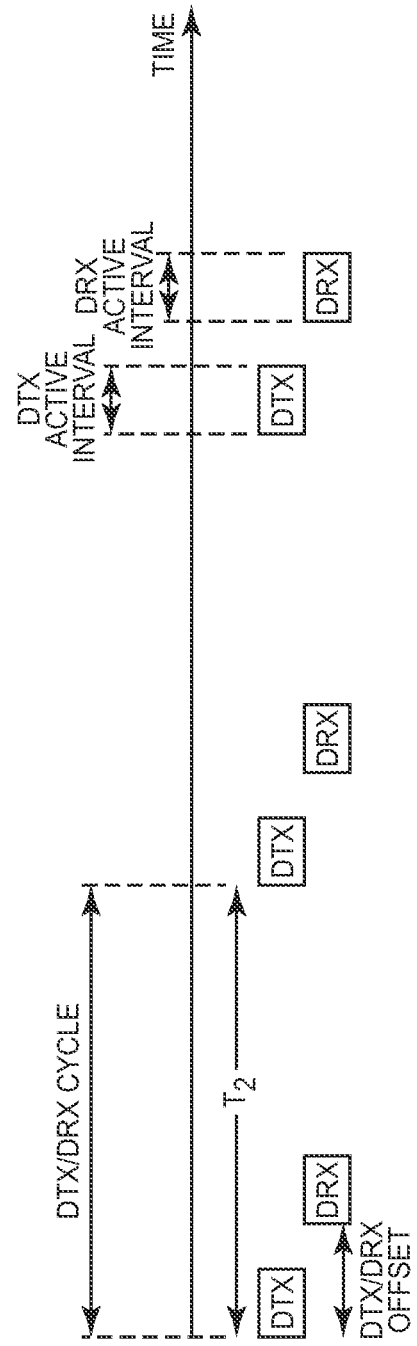

More specifically, FIGS. 2A and 2B illustrate two exemplary DTX and DRX patterns wherein DTX active intervals and DRX active intervals for the DTX/DRX mode of operation are arranged in DTX/DRX cycles and have a common duty cycle according to one embodiment of the present disclosure. As illustrated in FIG. 2A, the DTX/DRX mode of operation defines numerous periodic DTX/DRX cycles. Each DTX/DRX cycle includes a DTX active interval (DTX) during which a transmitter of the corresponding device (i.e., the wireless access node 12 or the UE 16) is activated and a DRX active interval (DRX) during which a receiver of the corresponding device (i.e., the wireless access node 12 or the UE 16) is activated. Cycle period ($T_1$) is a time from the start of one DTX/DRX cycle to the start of the next DTX/DRX cycle. As the time ($T_1$) decreases, the duty cycle for the DTX/DRX mode of operation increases (i.e., in this embodiment, as the time ($T_1$) decreases, the common duty cycle for both the DTX active intervals and the DRX active intervals increases). Specifically, the duty cycle for the DTX/DRX mode of operation is defined as the duration of the active interval (i.e., the duration of either the DTX active interval or the DRX active interval since they are equal) divided by the cycle period ($T_1$). For example, for a Long Term Evolution (LTE) network, each of the DTX/DRX active intervals may correspond to one or more frames, and the duty cycle for the DTX/DRX mode of operation may be defined as the number of DTX/DRX active intervals per a defined number of frames. It should be noted that while in many of the embodiments described herein the DTX active interval is equal to the DRX active interval, the present disclosure is not limited thereto. The DTX active interval may be greater than, less than, or equal to the DRX active interval depending on the particular implementation.

Within each DTX/DRX cycle, there is a time offset (DTX/DRX offset) from the start of the DTX active interval to the start of the DRX active interval. The DTX/DRX offset is a desired time offset for the particular implementation. For example, as discussed below, for Frequency Division Duplex (FDD) operation, the DTX/DRX offset may be 0. As another example, as discussed below, for Time Division Duplex (TDD) operation or for Half-Duplex Frequency Division Duplex (H-FDD) operation, the DTX/DRX offset may be equal to a duration of the DTX active interval. As yet another example, the DTX/DRX offset may be greater than the duration of the DTX active interval.

FIG. 2B is substantially the same as FIG. 2A. However, in FIG. 2B, the time the start of one DTX/DRX cycle and the start of the next DTX/DRX cycle is a time ($T_2$), where $T_2$ is greater than $T_1$. As such, the duty cycle for the DTX/DRX mode of operation in FIG. 2B is less than the duty cycle for the DTX/DRX mode of operation in FIG. 2A.

Figure 2C:
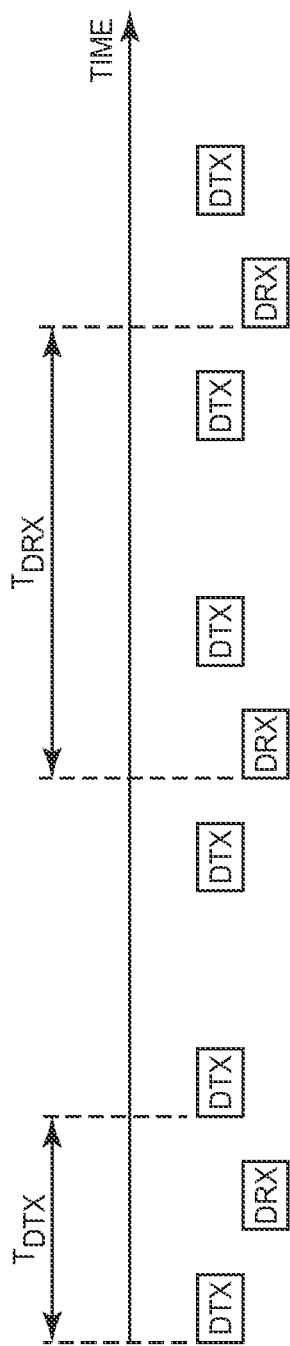
FIGS. 2C and 2C illustrate exemplary embodiments where a DTX duty cycle and a DRX duty cycle for a DTX/DRX mode of operation are independently controlled and may not be equal according to one embodiment of the present disclosure.
Figure 2D:
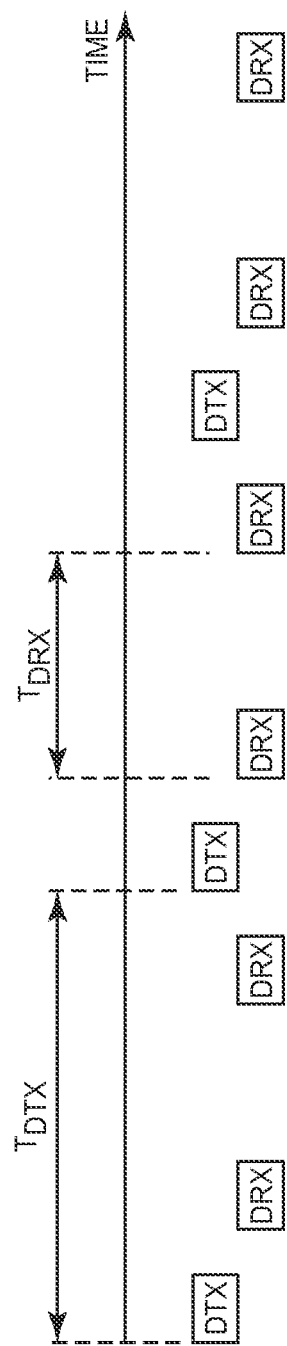

FIGS. 2C and 2D illustrate two exemplary DTX/DRX patterns wherein a duty cycle for the DTX active intervals and a duty cycle for the DRX active intervals are separately controlled and may not be equal according to another embodiment of the present disclosure. While this disclosure focuses on embodiments where the duty cycle for the DTX active intervals and the duty cycle for the DRX active intervals are equal (i.e., there is a common duty cycle for the DTX/DRX mode of operation), the present disclosure is not limited thereto. For instance, as illustrated in FIG. 2C, the duty cycle for the DTX active intervals may be greater than the duty cycle for the DRX active intervals. In other words, a time between successive DTX active intervals, $T_{DTX}$, may be less than a time between successive DRX active intervals, $T_{DRX}$. In contrast, as illustrated in FIG. 2D, the duty cycle for the DTX active intervals may be less than the duty cycle for the DRX active intervals. In other words, the time between successive DTX active intervals, $T_{DTX}$, may be greater than the time between successive DRX active intervals, $T_{DRX}$. Note that the duty cycle for the DTX active intervals and/or the duty cycle for the DRX active intervals are controlled based on an alertness state of the corresponding device (i.e., the corresponding wireless access node 12 or the corresponding UE 16) in the manner described below.

For the remainder of this disclosure, it is assumed that there is a common duty cycle for the DTX active intervals and the DRX active intervals for the DTX/DRX mode of operation, where this common duty cycle is referred to as the duty cycle for the DTX/DRX mode of operation. However, it should be appreciated that the concepts described are equally applicable to embodiments where the duty cycle for the DTX active intervals and the duty cycle for the DRX active intervals are separately controlled and may not be equal.

Figure 3:
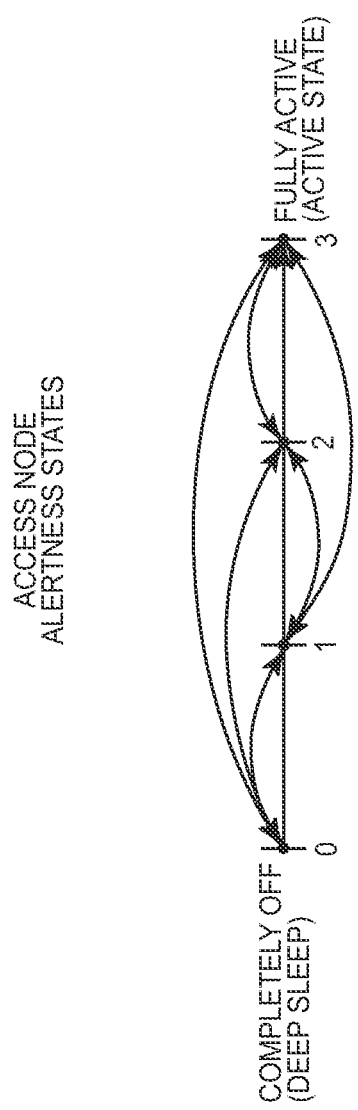
FIG. 3 illustrates exemplary alertness states for the wireless access nodes in the super dense network of FIG. 1 according to one embodiment of the present disclosure.

FIG. 3 illustrates a number of exemplary alertness states for each of the wireless access nodes 12 according to one embodiment of the present disclosure. In this exemplary embodiment, there are four alertness states, namely, alertness state 0, alertness state 1, alertness state 2, and alertness state 3. However, the number of alertness states may vary depending on the particular implementation. The alertness state 0 is a minimum alertness state for the wireless access node 12 and is also referred to herein as a deep sleep state. The alertness state 3 is a maximum alertness state for the wireless access node 12 and is also referred to herein as an active state. The alertness states 1 and 2 are intermediate alertness states, where the alertness state 2 is a higher alertness state than the alertness state 1.

Duty cycles for the DTX/DRX mode of operation for the wireless access node 12 are pre-assigned to the alertness states 0 to 3. In general, the duty cycle for the DTX/DRX mode of operation increases as the alertness state increases from alertness state 0 to alertness state 3. In one embodiment, each of the alertness states is assigned a different duty cycle for the DTX/DRX mode of operation where the duty cycle increases from alertness state 0 to alertness state 3 (i.e., the duty cycle for alertness state 3>the duty cycle for alertness state 2>the duty cycle for alertness state 1>the duty cycle for alertness state 0). In another embodiment, the duty cycle for the DTX/DRX mode of operation increases as the alertness state increases from alertness state 0 to alertness state 3 but the same duty cycle may be assigned to more than one of the alertness states (i.e., the duty cycle for alertness state 3>the duty cycle for alertness state 0, and the duty cycle for alertness state 3≥the duty cycle for alertness state 2≥the duty cycle for alertness state 1≥the duty cycle for alertness state 0).

Figure 4:
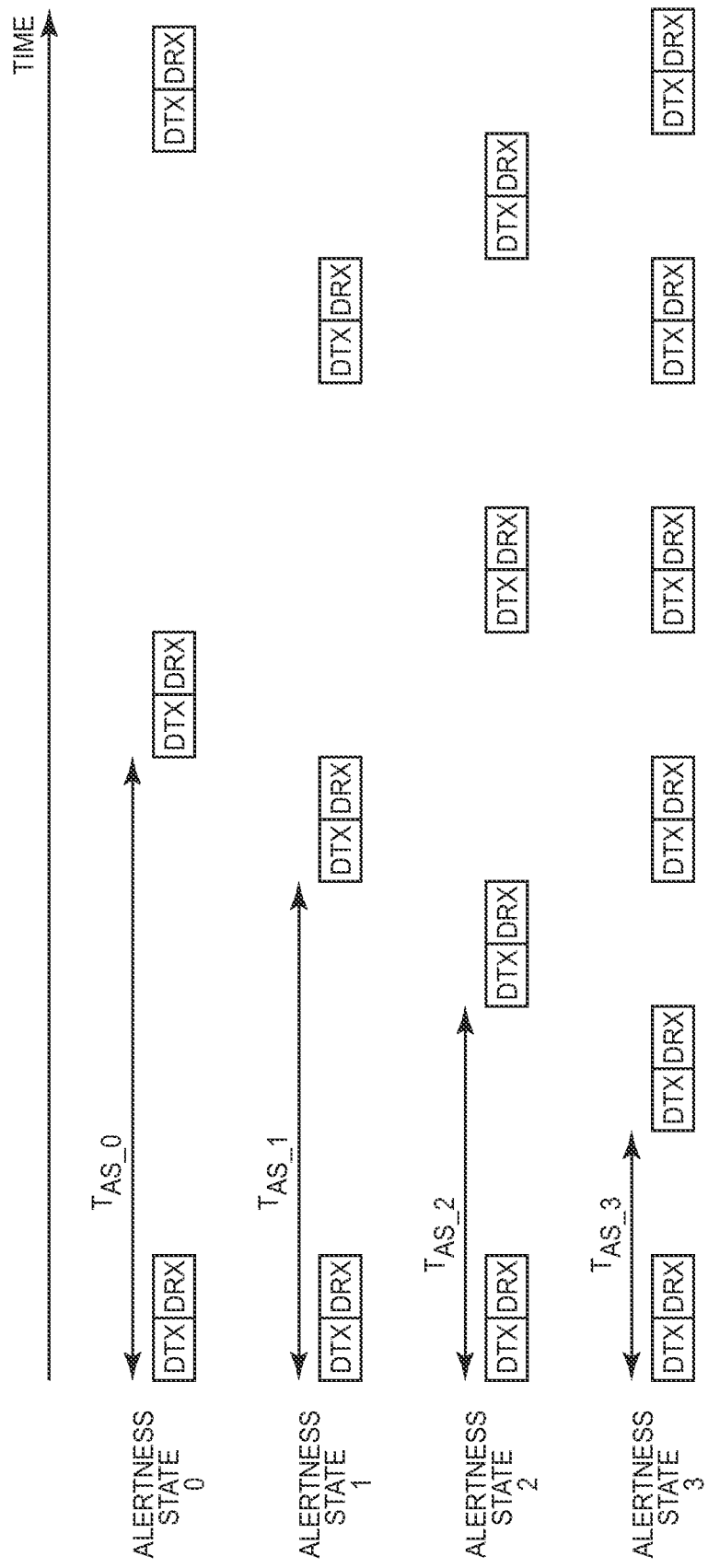
FIG. 4 illustrates exemplary DTX/DRX duty cycles assigned to the alertness states shown in FIG. 3 for a Time Division Duplex (TDD) mode of operation for the wireless access nodes in the super dense network according to one embodiment of the present disclosure.

FIG. 4 illustrates DTX/DRX cycles for the different alertness states of FIG. 3 for TDD operation, where each alertness state has a different duty cycle for the DTX/DRX mode of operation according to one embodiment of the present disclosure. It should be clear to those skilled in the art that the same illustration applies to H-FDD operation where transmission and reception are carried out at different times and frequencies, and thus hereinafter, we focus our descriptions on the TDD operation in this embodiment. Notably, in this embodiment, the DTX/DRX offset is equal to a duration of the DTX active interval such that the DTX active intervals and the DRX active intervals in the same DTX/DRX cycles are adjacent to one another in time. This may be preferable in order to avoid frequently ramping-up or ramping-down radio frequency circuits. As shown, the duty cycle for alertness state 3 is greater than the duty cycle for the alertness state 2, which is greater than the duty cycle for alertness state 1, which is greater than the duty cycle for alertness state 0. In other words, time ($T_{AS\_0}$) from the start of one DTX/DRX cycle to the start of the next DTX/DRX cycle for alertness state 0 is greater than time ($T_{AS\_1}$) from the start of one DTX/DRX cycle to the start of the next DTX/DRX cycle for alertness state 1, which is greater than time ($T_{AS\_2}$) from the start of one DTX/DRX cycle to the start of the next DTX/DRX cycle for alertness state 2, which is greater than time ($T_{AS\_3}$) from the start of one DTX/DRX cycle to the start of the next DTX/DRX cycle for alertness state 3.

Notably, in this example, the duty cycle for alertness state 0 is such that the transmitter and the receiver of the wireless access node 12 are periodically, but infrequently, active. However, in another embodiment, the transmitter and the receiver of the wireless access node 12 may be continuously inactive for alertness state 0. Similarly, in this example, the duty cycle for alertness state 3 is such that the transmitter and receiver of the wireless access node 12 are periodically, but not continuously, active. However, in another embodiment, the transmitter and the receiver of the wireless access node 12 may be continuously active for alertness state 3.

In one embodiment, the DTX active intervals and the DRX active intervals correspond to frames in the corresponding uplink or downlink channel. As an example, for alertness state 0, the DTX active intervals may be frame 1, frame 11, frame 21, etc., and the DRX active intervals may be frame 2, frame 12, frame 22, etc.; for alertness state 1, the DTX active intervals may be frame 1, frame 9, frame 17, etc., and the DRX active intervals may be frame 2, frame 10, frame 18, etc.; for alertness state 2, the DTX active intervals may be frame 1, frame 7, frame 13, etc., and the DRX active intervals may be frame 2, frame 8, frame 14, etc.; and for alertness state 3, the DTX active intervals may be frame 1, frame 5, frame 9, etc., and the DRX active intervals may be frame 2, frame 6, frame 10, etc. However, this example is for illustrative purposes only and is not intended to limit the scope of the present disclosure.

Figure 5:
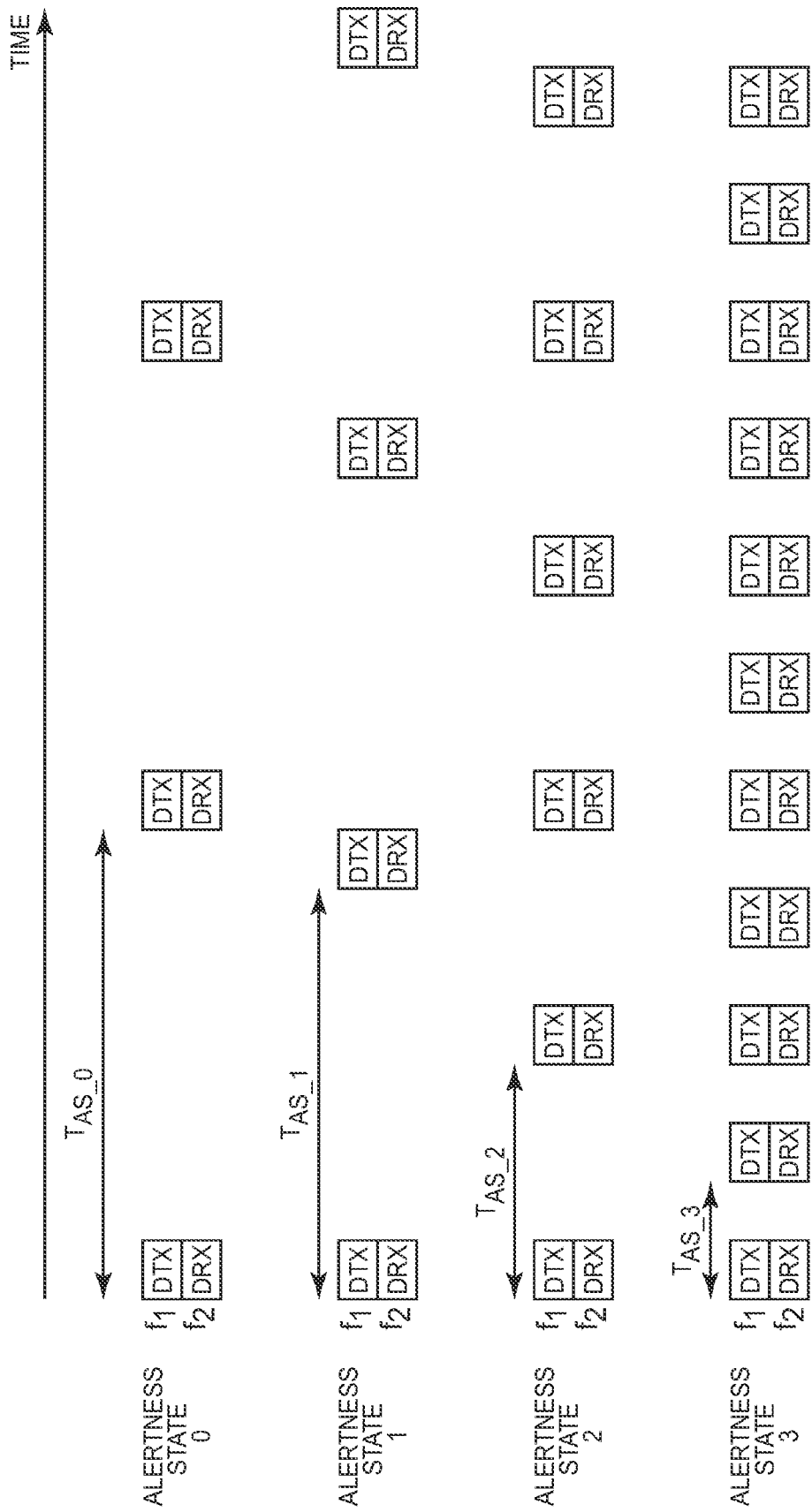
FIG. 5 illustrates exemplary DTX/DRX duty cycles assigned to the alertness states shown in FIG. 3 for a Frequency Division Duplex (FDD) mode of operation for the wireless access nodes in the super dense network according to one embodiment of the present disclosure.

FIG. 5 illustrates DTX/DRX cycles for the different alertness states of FIG. 3 for FDD operation, where each alertness state has a different duty cycle for the DTX/DRX mode of operation according to one embodiment of the present disclosure. Notably, in this embodiment, the DTX/DRX offset is equal to 0 such that the DTX active intervals and the DRX active intervals in the same DTX/DRX cycles are time-aligned, but due to FDD operation use different frequencies. This may be preferable in order to avoid frequently ramping-up or ramping-down radio frequency circuits. As shown, the duty cycle for alertness state 3 is greater than the duty cycle for alertness state 2, which is greater than the duty cycle for alertness state 1, which is greater than the duty cycle for alertness state 0. In other words, time ($T_{AS\_0}$) from the start of one DTX/DRX cycle to the start of the next DTX/DRX cycle for alertness state 0 is greater than time ($T_{AS\_1}$) from the start of one DTX/DRX cycle to the start of the next DTX/DRX cycle for alertness state 1, which is greater than time ($T_{AS\_2}$) from the start of one DTX/DRX cycle to the start of the next DTX/DRX cycle for alertness state 2, which is greater than time ($T_{AS\_3}$) from the start of one DTX/DRX cycle to the start of the next DTX/DRX cycle for alertness state 3.

Notably, in this example, the duty cycle for alertness state 0 is such that the transmitter and the receiver of the wireless access node 12 are periodically, but infrequently, active. However, in another embodiment, the transmitter and the receiver of the wireless access node 12 may be continuously inactive for alertness state 0. Similarly, in this example, the duty cycle for alertness state 3 is such that the transmitter and receiver of the wireless access node 12 are periodically, but not continuously, active. However, in another embodiment, the transmitter and the receiver of the wireless access node 12 may be continuously active for alertness state 3.

In one embodiment, the DTX active intervals and the DRX active intervals correspond to frames in the corresponding uplink or downlink channel. As an example, for alertness state 0, the DTX active intervals may be frame 1, frame 9, frame 17, etc., and the DRX active intervals may be frame 2, frame 10, frame 18, etc.; for alertness state 1, the DTX active intervals may be frame 1, frame 7, frame 13, etc., and the DRX active intervals may be frame 2, frame 8, frame 14, etc.; for alertness state 2, the DTX active intervals may be frame 1, frame 5, frame 9, etc., and the DRX active intervals may be frame 2, frame 6, frame 10, etc.; and for alertness state 3, the DTX active intervals may be frame 1, frame 3, frame 5, etc., and the DRX active intervals may be frame 2, frame 4, frame 6, etc. However, this example is for illustrative purposes only and is not intended to limit the scope of the present disclosure.

Figure 6:
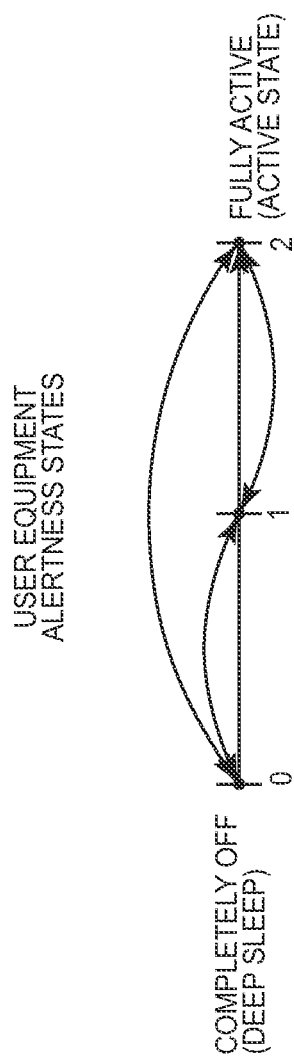
FIG. 6 illustrates exemplary alertness states for user equipment devices (UEs) in the super dense network of FIG. 1 according to one embodiment of the present disclosure.
Figure 7:
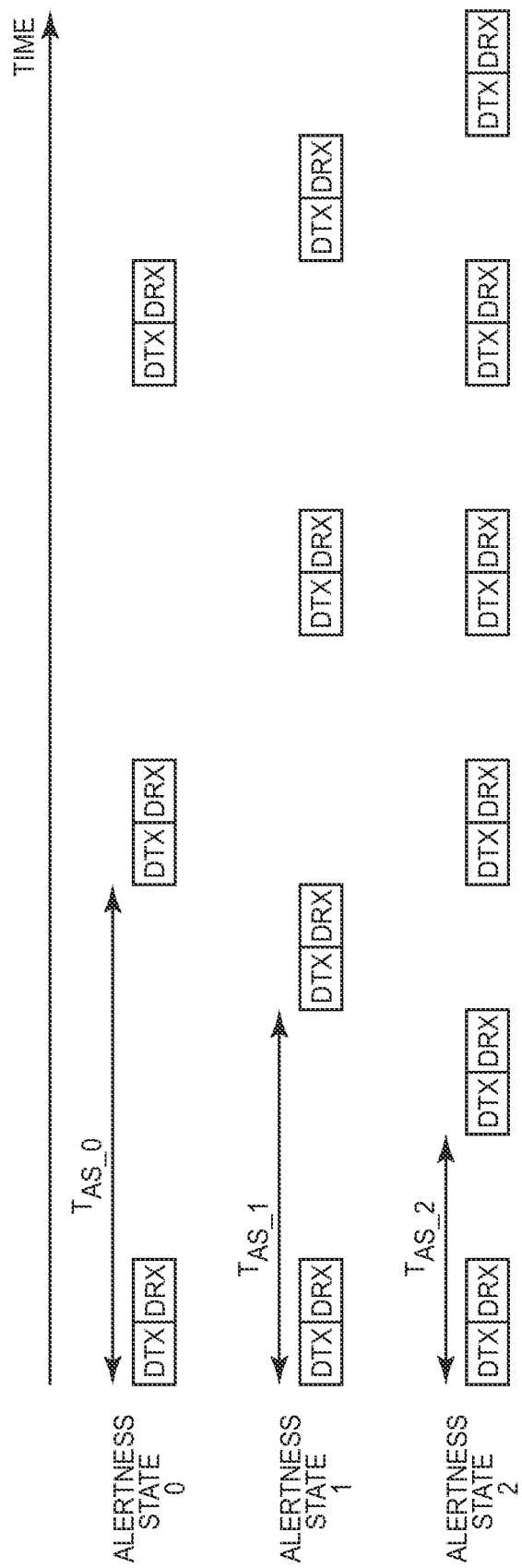
FIG. 7 illustrates exemplary DTX/DRX duty cycles assigned to the alertness states shown in FIG. 6 for a TDD mode of operation for the UEs in the super dense network according to one embodiment of the present disclosure.
Figure 8:
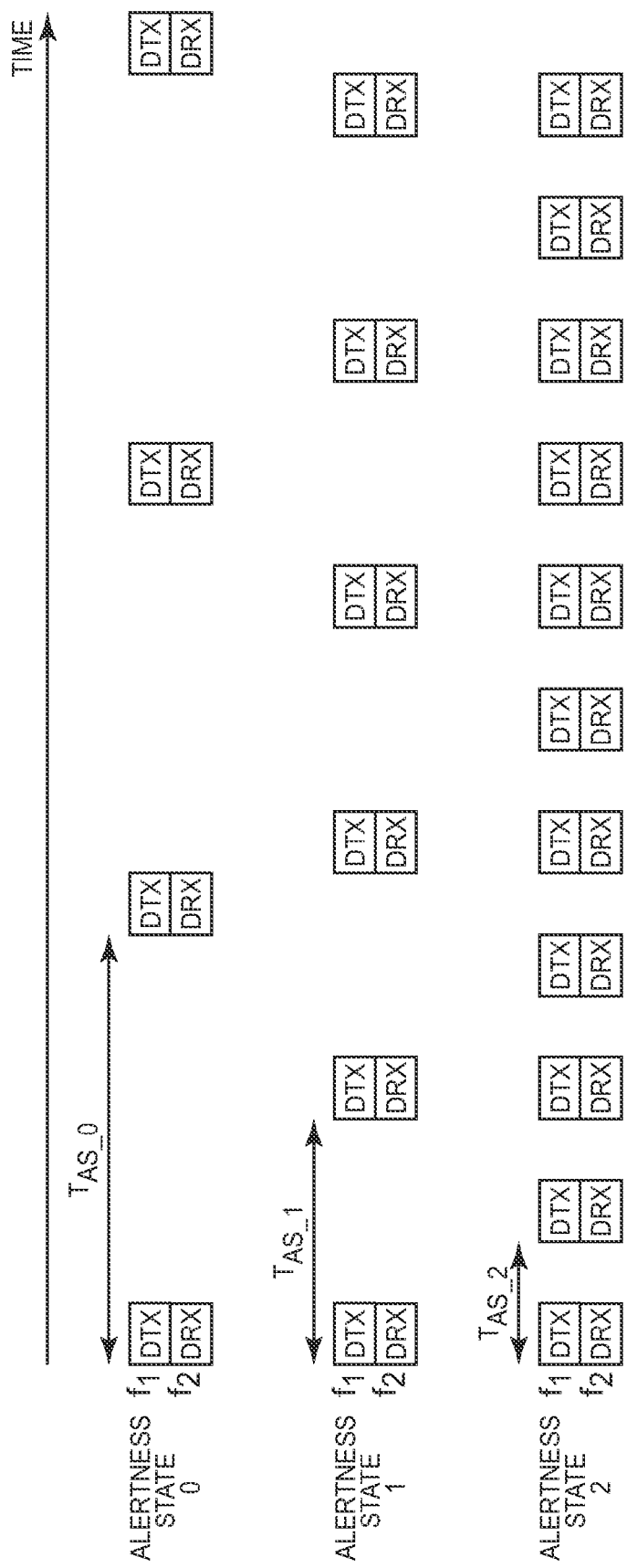
FIG. 8 illustrates exemplary DTX/DRX duty cycles assigned to the alertness states shown in FIG. 6 for a FDD mode of operation for the UEs in the super dense network according to one embodiment of the present disclosure.

FIGS. 6 through 8 are similar to FIGS. 3 through 5, but illustrate exemplary alertness states and duty cycles for the UEs 16 according to corresponding embodiments of the present disclosure. More specifically, FIG. 6 illustrates a number of exemplary alertness states for each of the UEs 16 according to one embodiment of the present disclosure. In this exemplary embodiment, there are three alertness states, namely, alertness state 0, alertness state 1, and alertness state 2. The alertness state 0 is a minimum alertness state for the UE 16 and is also referred to herein as a deep sleep state.

The alertness state 2 is a maximum alertness state for the UE 16 and is also referred to herein as an active state. The alertness state 1 is an intermediate alertness state.

Duty cycles for the DTX/DRX mode of operation for the UE 16 are pre-assigned to the alertness states 0 to 2. In general, the duty cycle for the DTX/DRX mode of operation increases as the alertness state increases from alertness state 0 to alertness state 2. In one embodiment, each of the alertness states is assigned a different duty cycle for the DTX/DRX mode of operation where the duty cycle increases from alertness state 0 to alertness state 2 (i.e., the duty cycle for alertness state 2>the duty cycle for alertness state 1>the duty cycle for alertness state 0). In another embodiment, the duty cycle for the DTX/DRX mode of operation increases as the alertness state increases from alertness state 0 to alertness state 2 but the same duty cycle may be assigned to more than one of the alertness states (i.e., the duty cycle for alertness state 2>the duty cycle for alertness state 0, and the duty cycle for alertness state 2≥the duty cycle for alertness state 1≥the duty cycle for alertness state 0).

FIG. 7 illustrates DTX/DRX cycles for the different alertness states of FIG. 6 for TDD operation, where each alertness state has a different duty cycle for the DTX/DRX mode of operation according to one embodiment of the present disclosure. Notably, in this embodiment, the DTX/DRX offset is equal to a duration of the DTX active interval such that the DTX active intervals and the DRX active intervals in the same DTX/DRX cycles are adjacent to one another in time. This may be preferable in order to avoid frequently ramping-up or ramping-down radio frequency circuits. As shown, the duty cycle for alertness state 2 is greater than the duty cycle for alertness state 1, which is greater than the duty cycle for alertness state 0. In other words, time ($T_{AS\_0}$) from the start of one DTX/DRX cycle to the start of the next DTX/DRX cycle for alertness state 0 is greater than time ($T_{AS\_1}$) from the start of one DTX/DRX cycle to the start of the next DTX/DRX cycle for alertness state 1, which is greater than time ($T_{AS\_2}$) from the start of one DTX/DRX cycle to the start of the next DTX/DRX cycle for alertness state 2.

Notably, in this example, the duty cycle for alertness state 0 is such that the transmitter and the receiver of the UE 16 are periodically, but infrequently, active. However, in another embodiment, the transmitter and the receiver of the UE 16 may be continuously inactive for alertness state 0. Similarly, in this example, the duty cycle for alertness state 2 is such that the transmitter and receiver of the UE 16 are periodically, but not continuously, active. However, in another embodiment, the transmitter and the receiver of the UE 16 may be continuously active for alertness state 2.

In one embodiment, the DTX active intervals and the DRX active intervals correspond to frames in the corresponding uplink or downlink channel. As an example, for alertness state 0, the DTX active intervals may be frame 1, frame 9, frame 17, etc., and the DRX active intervals may be frame 2, frame 10, frame 18, etc.; for alertness state 1, the DTX active intervals may be frame 1, frame 7, frame 13, etc., and the DRX active intervals may be frame 2, frame 8, frame 14, etc.; and for alertness state 2, the DTX active intervals may be frame 1, frame 5, frame 9, etc., and the DRX active intervals may be frame 2, frame 6, frame 10, etc. However, this example is for illustrative purposes only and is not intended to limit the scope of the present disclosure.

FIG. 8 illustrates DTX/DRX cycles for the different alertness states of FIG. 6 for FDD operation, where each alertness state has a different duty cycle for the DTX/DRX mode of operation according to one embodiment of the present disclosure. Notably, in this embodiment, the DTX/DRX offset is equal to 0 such that the DTX active intervals and the DRX active intervals in the same DTX/DRX cycles are time-aligned, but due to FDD operation use different frequencies. This may be preferable in order to avoid frequently ramping-up or ramping-down radio frequency circuits. As shown, the duty cycle for alertness state 2 is greater than the duty cycle for the alertness state 1, which is greater than the duty cycle for alertness state 0. In other words, time ($T_{AS\_0}$) from the start of one DTX/DRX cycle to the start of the next DTX/DRX cycle for alertness state 0 is greater than time ($T_{AS\_1}$) from the start of one DTX/DRX cycle to the start of the next DTX/DRX cycle for alertness state 1, which is greater than time ($T_{AS\_2}$) from the start of one DTX/DRX cycle to the start of the next DTX/DRX cycle for alertness state 2.

Notably, in this example, the duty cycle for alertness state 0 is such that the transmitter and the receiver of the UE 16 are periodically, but infrequently, active. However, in another embodiment, the transmitter and the receiver of the UE 16 may be continuously inactive for alertness state 0. Similarly, in this example, the duty cycle for alertness state 2 is such that the transmitter and the receiver of the UE 16 are periodically, but not continuously, active. However, in another embodiment, the transmitter and the receiver of the UE 16 may be continuously active for alertness state 3.

In one embodiment, the DTX active intervals and the DRX active intervals correspond to frames in the corresponding uplink or downlink channel. As an example, for alertness state 0, the DTX active intervals may be frame 1, frame 7, frame 13, etc., and the DRX active intervals may be frame 2, frame 8, frame 14, etc.; for alertness state 1, the DTX active intervals may be frame 1, frame 5, frame 9, etc., and the DRX active intervals may be frame 2, frame 6, frame 10, etc.; and for alertness state 2, the DTX active intervals may be frame 1, frame 3, frame 5, etc., and the DRX active intervals may be frame 2, frame 4, frame 6, etc. However, this example is for illustrative purposes only and is not intended to limit the scope of the present disclosure.

Figure 9:
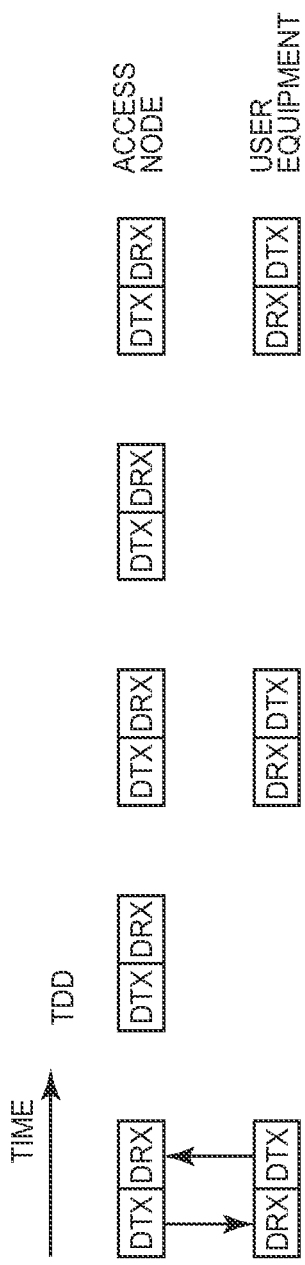
FIG. 9 illustrates time-alignment of DTX/DRX cycles of a wireless access node in the super dense network and DTX/DRX cycles of a UE for a TDD mode of operation according to one embodiment of the present disclosure.
Figure 10:
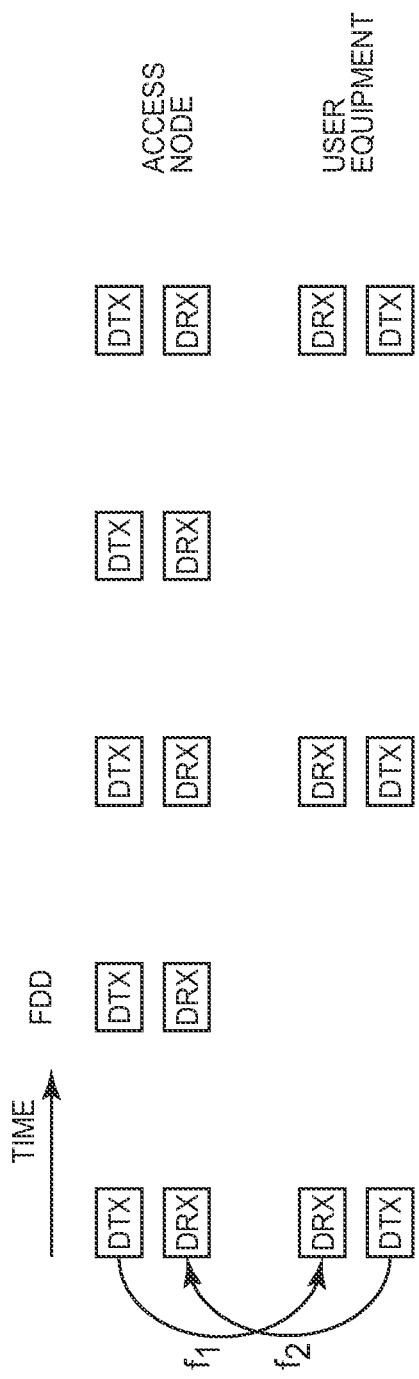
FIG. 10 illustrates time and frequency alignment of DTX/DRX cycles of a wireless access node in the super dense network and DTX/DRX cycles of a UE for a FDD mode of operation according to one embodiment of the present disclosure.

FIGS. 9 and 10 illustrate time-alignment of DTX cycles and corresponding DRX cycles between the wireless access node 12 and the UE 16 according to one embodiment of the present disclosure. In general, the DTX cycles and the DRX cycles are predefined such that, after synchronization of the wireless access node 12 and the UE 16: (1) at least a subset of the DTX active intervals for the wireless access node 12 are time-aligned with a least a subset of the DRX active intervals for the UE 16 regardless of the alertness states of the wireless access node 12 and the UE 16 and (2) at least a subset of the DRX active intervals for the wireless access node 12 are time-aligned with a least a subset of the DTX active intervals for the UE 16. Notably, this time-alignment is provided regardless of the alertness states of the wireless access node 12 and the UE 16. Therefore, even if the duty cycles for the wireless access node 12 and the UE 16 are different, the DTX cycles and the DRX cycles are predefined such that at least some of the DTX active intervals of the wireless access node 12 are time-aligned with at least some of the DRX active intervals of the UE 16 and at least some of the DRX active intervals of the wireless access node 12 are time-aligned with at least some of the DTX active intervals of the UE 16. Of course, if either the wireless access node 12 or the UE 16 is in alertness state 0 and the transmitter and the receiver of that device are continuously off for alertness state 0, then there would be no DTX active intervals or DRX active intervals to be time-aligned with corresponding DTX active intervals and DRX active intervals for the other device.

More specifically, FIG. 9 illustrates time-alignment of DTX cycles and corresponding DRX cycles between the wireless access node 12 and the UE 16 for TDD operation according to one embodiment of the present disclosure. As illustrated, in this particular example, the duty cycle for the DTX/DRX mode of operation of the wireless access node 12 is greater than the duty cycle for the DTX/DRX mode of operation of the UE 16. However, the present disclosure is not limited thereto. The duty cycle for the DTX/DRX mode of operation of the wireless access node 12 may alternatively be less than or equal to that of the UE 16. In this particular example, the DTX active interval of every other DTX/DRX cycle for the wireless access node 12 is time-aligned with a corresponding DRX active interval for the UE 16. As such, during those periods of time, signals transmitted by the wireless access node 12 can be received by the UE 16. Similarly, in this particular example, the DRX active interval of every other DTX/DRX cycle for the wireless access node 12 is time-aligned with a corresponding DTX active interval for the UE 16. As such, during those periods of time, signals transmitted by the UE 16 can be received by the wireless access node 12.

FIG. 10 illustrates time and frequency alignment of DTX cycles and corresponding DRX cycles between the wireless access node 12 and the UE 16 for FDD operation according to one embodiment of the present disclosure. As illustrated, in this particular example, the duty cycle for the DTX/DRX mode of operation of the wireless access node 12 is greater than the duty cycle for the DTX/DRX mode of operation of the UE 16. However, the present disclosure is not limited thereto. The duty cycle for the DTX/DRX mode of operation of the wireless access node 12 may alternatively be less than or equal to that of the UE 16. In this particular example, the DTX active interval of every other DTX/DRX cycle for the wireless access node 12 is time and frequency aligned with a corresponding DRX active interval for the UE 16. As such, during those periods of time, signals transmitted by the wireless access node 12 can be received by the UE 16. Similarly, in this particular example, the DRX active interval of every other DTX/DRX cycle for the wireless access node 12 is time and frequency aligned with a corresponding DTX active interval for the UE 16. As such, during those periods of time, signals transmitted by the UE 16 can be received by the wireless access node 12.

Figure 11:
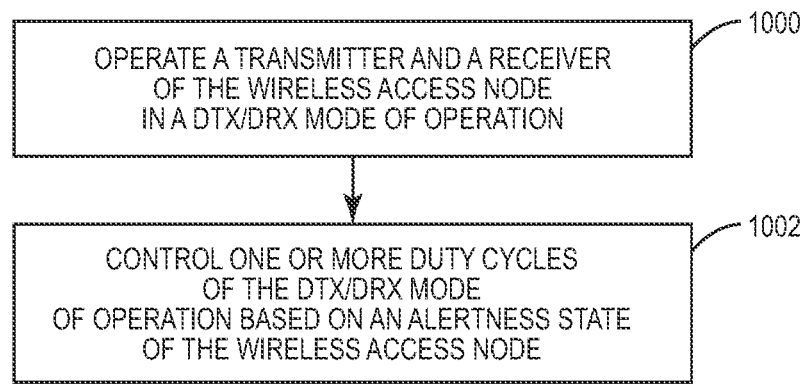
FIG. 11 is a flow chart that illustrates the operation of the wireless access nodes in the super dense network according to one embodiment of the present disclosure.

FIG. 11 is a flow chart illustrating the operation of the wireless access node 12 according to one embodiment of the present disclosure. First, the wireless access node 12 operates a transmitter and a receiver of the wireless access node 12 in a DTX/DRX mode of operation (step 1000). The wireless access node 12 then controls one or more duty cycles of the DTX/DRX mode of operation based on an alertness state of the wireless access node 12 (step 1002). As such, as the alertness state of the wireless access node 12 changes in response to triggering events, the wireless access node 12 changes the duty cycle of the DTX/DRX mode of operation appropriately. As discussed above, this disclosure focuses on embodiments where the one or more duty cycles are a common duty cycle for the DTX active intervals and the DRX active intervals of the DTX/DRX mode of operation, where this common duty cycle is referred to as the duty cycle of the DTX/DRX mode of operation. However, the present disclosure is not limited thereto. The one or more duty cycles controlled by the wireless access node 12 may be the duty cycle for the DTX active intervals, the duty cycle for the DRX active intervals, or both the duty cycle for the DTX active intervals and the duty cycle for the DRX active intervals.

Figure 12:
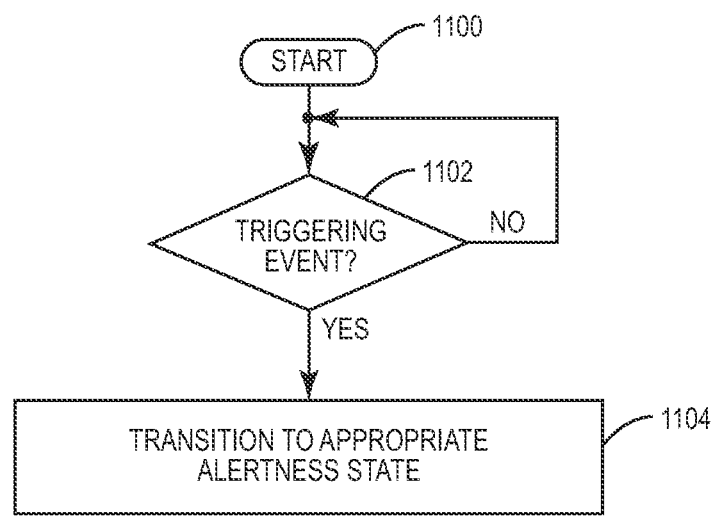
FIG. 12 is a more detailed illustration of one embodiment of a process performed by a wireless access node to control the duty cycle of the DTX/DRX mode of operation based on the alertness state of the wireless access node.

FIG. 12 is a flow chart illustrating the operation of the wireless access node 12 to control the duty cycle of the DTX/DRX mode of operation based on the alertness state of the wireless access node 12 according to one embodiment of the present disclosure. As illustrated, the wireless access node 12 starts in some initial alertness state (e.g., alertness state 0) (step 1100). The wireless access node 12 monitors for a triggering event (step 1102). If a triggering event is not detected, the wireless access node 12 continues to wait for a triggering event while operating in the same alertness state. If a triggering event is detected, the wireless access node 12 transitions to an appropriate alertness state in response to the triggering event (step 1104). The alertness state may be increased or decreased depending on the triggering event.

In one embodiment, the triggering event specifies an alertness state to which the wireless access node 12 is to transition. In another embodiment, the triggering event provides other parameters which are used by the wireless access node 12 to determine the alertness state to which to transition. For example, the triggering event may indicate that the UE 16 is an active UE located within the cell 14 covered by the wireless access node 12. In response, the wireless access node 12 transitions to the active state. As another example, the triggering event may indicate that the UE 16 is an active UE located in the cell 14 of a neighboring wireless access node 12. In response, the wireless access node 12 may transition to an intermediate alertness level.

In one scenario, if the wireless access node 12 is in the deep sleep state (e.g., alertness state 0), the triggering event is receipt of a wakeup signal. The wakeup signal may be from the UE 16, from another wireless access node 12, or from another network entity (e.g., a node in a higher level of a hierarchical network). For example, the UE 16 may periodically transmit a wakeup signal (e.g., a UE-specific or system-specific signature) during the DTX active intervals for the UE 16. The periodicity of the transmission from the UE 16 depends on the alertness state of the UE 16 and thus the duty cycle for the DTX/DRX mode of operation for the UE 16. The wireless access node 12 may then receive the wakeup signal during one of its DRX active intervals.

As another example, the wireless access node 12 may receive the wakeup signal from a neighboring wireless access node 12 via direct or indirect access node to access node communication (e.g., an X2 interface between LTE access nodes or base stations). The neighboring wireless access node 12 may send the wakeup signal in response to, for example, detecting an active UE 16 within the cell 14 served by the neighboring wireless access node 12. As yet another example, another network node may send the wakeup signal to the wireless access node 12 in response to, for example, determining that an active UE 16 is located within the cell 14 served by the wireless access node 12 or determining that an active UE 16 is located within the cell 14 served by a neighboring wireless access node 12.

As yet another example, the wakeup signal may be from a detection mechanism associated with the wireless access node 12 that operates to detect when one of the UEs 16 is located within the vicinity of the wireless access node 12. The detection mechanism may be, for example, a passive or active Radio Frequency Identification (RFID) reader, where an RFID tag is included in the UEs 16 and detected by the RFID reader associated with or included in the wireless access node 12 when the UE 16 is in the vicinity of the wireless access node 12. Thus, in this example, the UE 16 is in the vicinity of the wireless access node 12 when the RFID tag in the UE 16 is within range of the RFID reader of the wireless access node 12. Note that other detection mechanisms may alternatively be used.

Note that a wakeup signal is just one exemplary type of triggering event. Other types of triggering events may be network requests, requests from neighboring wireless access nodes 12, request from one or more the UEs 16, detection of one or more of the UEs 16 in the vicinity of the wireless access node 12, or the like. For example, if one of the UEs 16 is an active UE in the cell 14 of one of the neighboring wireless access nodes 12, the wireless access node 12 may receive a request from the neighboring wireless access node 12 to transition to an intermediate alertness state.

Figure 13:
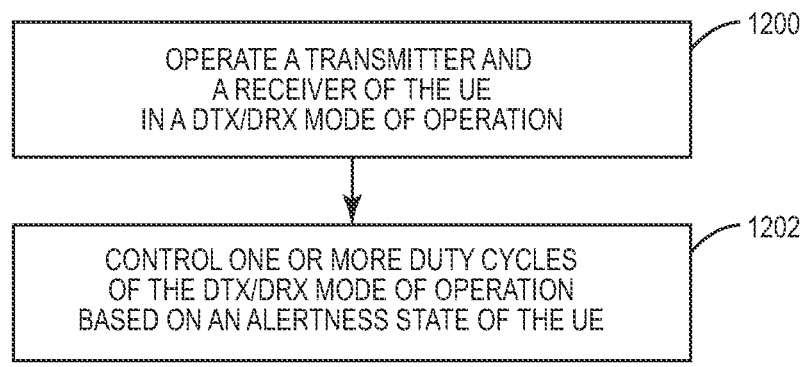
FIG. 13 is a flow chart that illustrates the operation of the UEs in the super dense network according to one embodiment of the present disclosure.

FIG. 13 is a flow chart illustrating the operation of the UE 16 according to one embodiment of the present disclosure. First, the UE 16 operates a transmitter and a receiver of the UE 16 in a DTX/DRX mode of operation (step 1200). The UE 16 then controls one or more duty cycles of the DTX/DRX mode of operation based on an alertness state of the UE 16 (step 1202). As such, as the alertness state of the UE 16 changes in response to triggering events, the UE 16 changes the duty cycle of the DTX/DRX mode of operation appropriately. As discussed above, this disclosure focuses on embodiments where the one or more duty cycles are a common duty cycle for the DTX active intervals and the DRX active intervals of the DTX/DRX mode of operation, where this common duty cycle is referred to as the duty cycle of the DTX/DRX mode of operation. However, the present disclosure is not limited thereto. The one or more duty cycles controlled by the UE 16 may be the duty cycle for the DTX active intervals, the duty cycle for the DRX active intervals, or both the duty cycle for the DTX active intervals and the duty cycle for the DRX active intervals.

Figure 14:
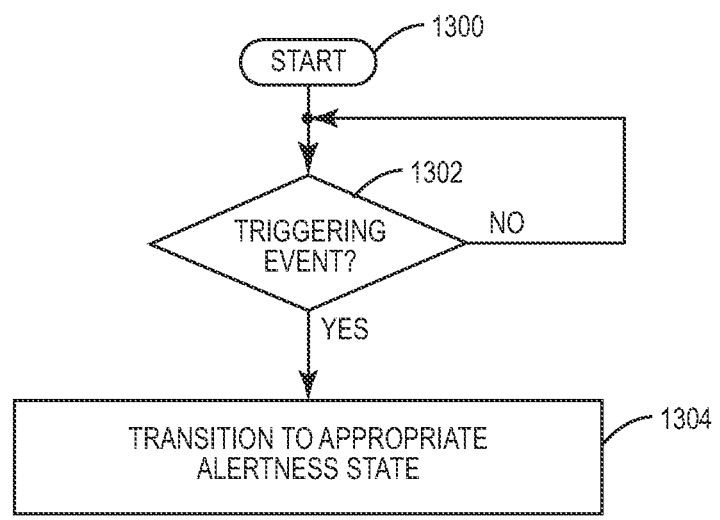
FIG. 14 is a more detailed illustration of one embodiment of a process performed by a UE to control the duty cycle of the DTX/DRX mode of operation based on the alertness state of the wireless access node.

FIG. 14 is a flow chart illustrating the operation of the UE 16 to control the duty cycle of the DTX/DRX mode of operation based on the alertness state of the UE 16 according to one embodiment of the present disclosure. As illustrated, the UE 16 starts in some initial alertness state (e.g., alertness state 0) (step 1300). The UE 16 monitors for a triggering event (step 1302). If a triggering event is not detected, the UE 16 continues to wait for a triggering event while operating in the same alertness state. If a triggering event is detected, the UE 16 transitions to an appropriate alertness state in response to the triggering event (step 1304). The alertness state may be increased or decreased depending on the triggering event. In one embodiment, the triggering event specifies an alertness state to which the UE 16 is to transition. In another embodiment, the triggering event provides other parameters which are used by the UE 16 to determine the alertness state to which to transition. For example, a wakeup signal may indicate that the UE 16 desires to actively send or receive data. In response, the UE 16 transitions to the active state.

In one scenario, if the UE 16 is in the deep sleep state (e.g., alertness state 0), the triggering event is receipt of a wakeup signal. The wakeup signal may be generated internally by the UE 16 in response to user activity or received from one of the wireless access nodes 12. For example, the wakeup signal may be generated internally by the UE 16 in response to user activity such as, for instance, sending a Multimedia Messaging Service (MMS) message, requesting web content via a web browser running on the UE 16, requesting multimedia content from a web service, or the like. As another example, one of the wireless access nodes 12 may periodically transmit a wakeup signal (e.g., a UE-specific or system-specific signature) during the DTX active intervals for the wireless access node 12. The periodicity of the transmission from the wireless access node 12 depends on the alertness state of the wireless access node 12 and thus the duty cycle for the DTX/DRX mode of operation for the wireless access node 12. The UE 16 may then receive the wakeup signal during one of its DRX active intervals. Note that a wakeup signal is just one exemplary type of triggering event. Other types of triggering events are, for example, a request from one of the wireless access nodes 12 to, for example, receive data, perform measurements, answer to paging, or the like; user activity; an absence of user activity; or the like.

Figure 15:
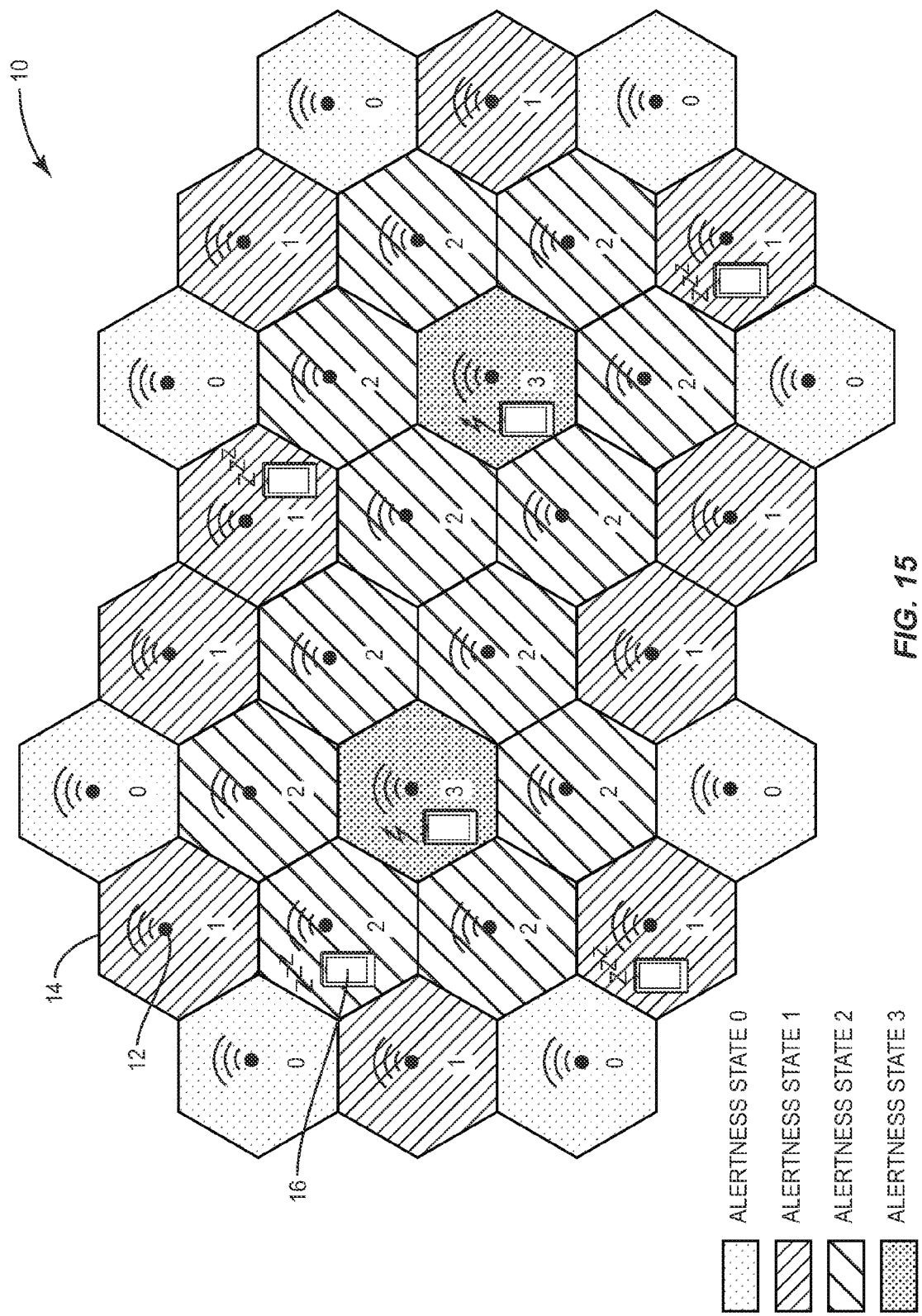
FIG. 15 illustrates an example of a super dense network and alertness states of the wireless access nodes in the super dense network according to one embodiment of the present disclosure.

FIG. 15 is a snap-shot of an exemplary embodiment of the super dense network 10 showing numerous wireless access nodes 12 and UEs 16 in various alertness states. As shown, the wireless access nodes 12 having active UEs 16 located within their corresponding cells 14 are in alertness state 3 (i.e., the active state). The wireless access nodes 12 that neighbor the wireless access nodes 12 in alertness state 3 are in alertness state 2. The alertness states of these neighboring wireless access nodes 12 is elevated to alertness state 2 due to the possibility that the active UEs 16 may move to the cells 14 of those neighboring wireless access nodes 12. Also, the wireless access nodes 12 serving the cells 14 in which inactive UEs 16 are located may be configured in alertness state 1. Note that some other wireless access nodes 12 are in alertness state 1 due to other rules.

Figure 16:
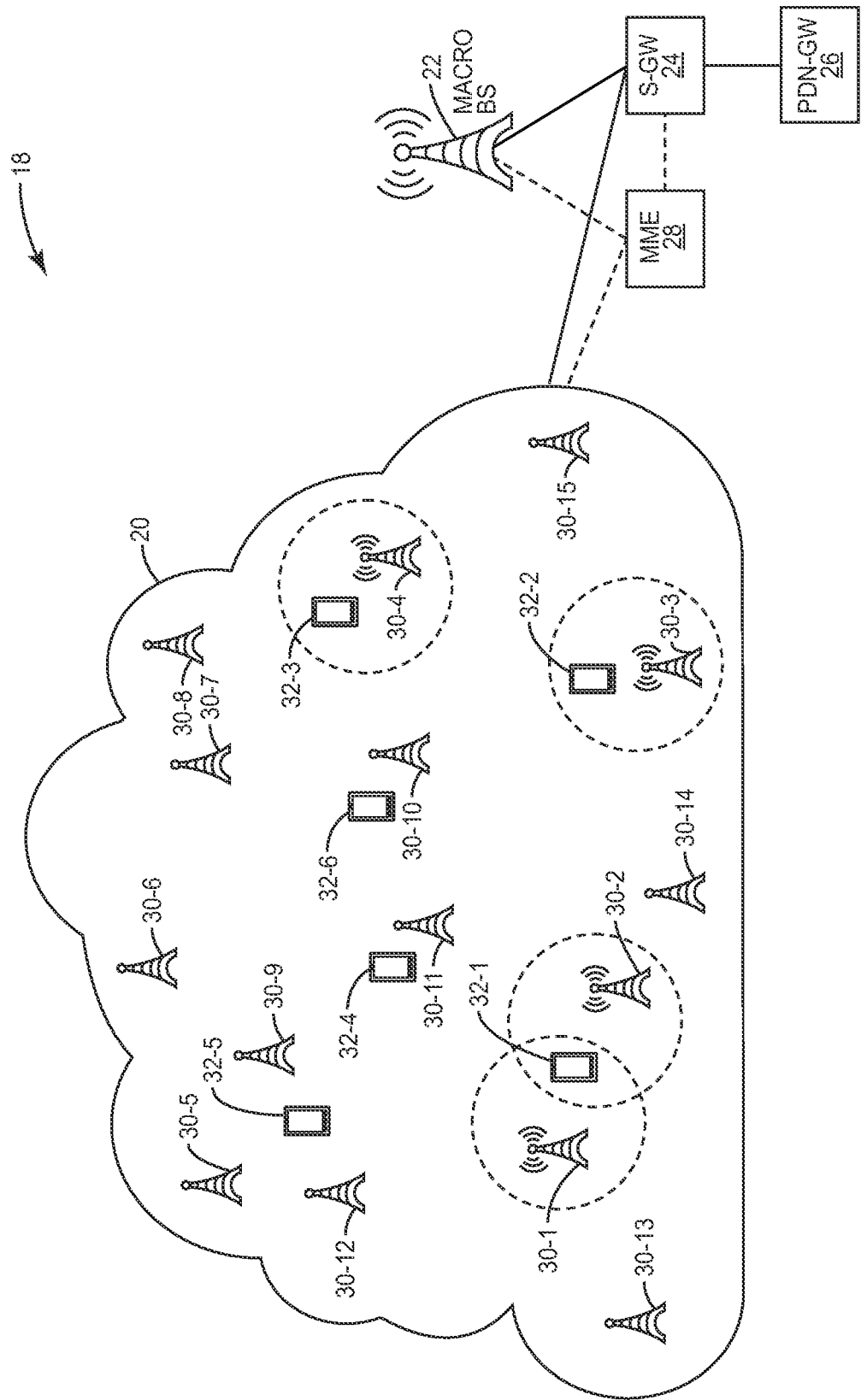
FIG. 16 illustrates a cellular communication network that includes an overlay network and a super dense network according to another embodiment of the present disclosure.

FIG. 16 illustrates a cellular communication network 18 that includes an overlay network and a super dense network 20 according to another embodiment of the present disclosure. More specifically, in this embodiment, the overlay network includes a number of macro base stations 22, a Serving Gateway (S-GW) 24, a Packet Data Network Gateway (PDN-GW) 26, and a Mobility Management Entity (MME) 28 connected as shown. As an example, the overlay network may be, or be similar to, a conventional cellular communication network (e.g., LTE or LTE-Advanced network, WiMAX network, or similar cellular communication network). The super dense network 20 is similar to the super dense network 10 described above. More specifically, the super dense network 20 includes a number of wireless access nodes 30-1 through 30-15 (generally referred to herein collectively as the wireless access nodes 30 and individually as wireless access node 30). UEs 32-1 through 32-6 (generally referred to herein collectively as the UEs 32 and individually as UE 32) are located within the super dense network 20. In this example, the wireless access nodes 30-1 through 30-4 are in the active state and are operating to serve active UEs 32-1, 32-2, and 32-3 located in the cells of the wireless access nodes 30-1 through 30-4.

The wireless access nodes 30 and the UEs 32 operate in a DTX/DRX mode of operation where, as described above, the duty cycles for the DTX/DRX mode of operation for the wireless access nodes 30 and the UEs 32 are controlled based on the alertness states of the wireless access nodes 30 and the UEs 32 in the manner described above. However, in this embodiment, the overlay network operates to, among other things, provide triggering events for transitions in the alertness states of the wireless access nodes 30 and, in some embodiments, the UEs 32. Note, however, that other types of triggering events may also be used to change the alertness states of the wireless access nodes 30 and/or the UEs 32.

Figure 17A:
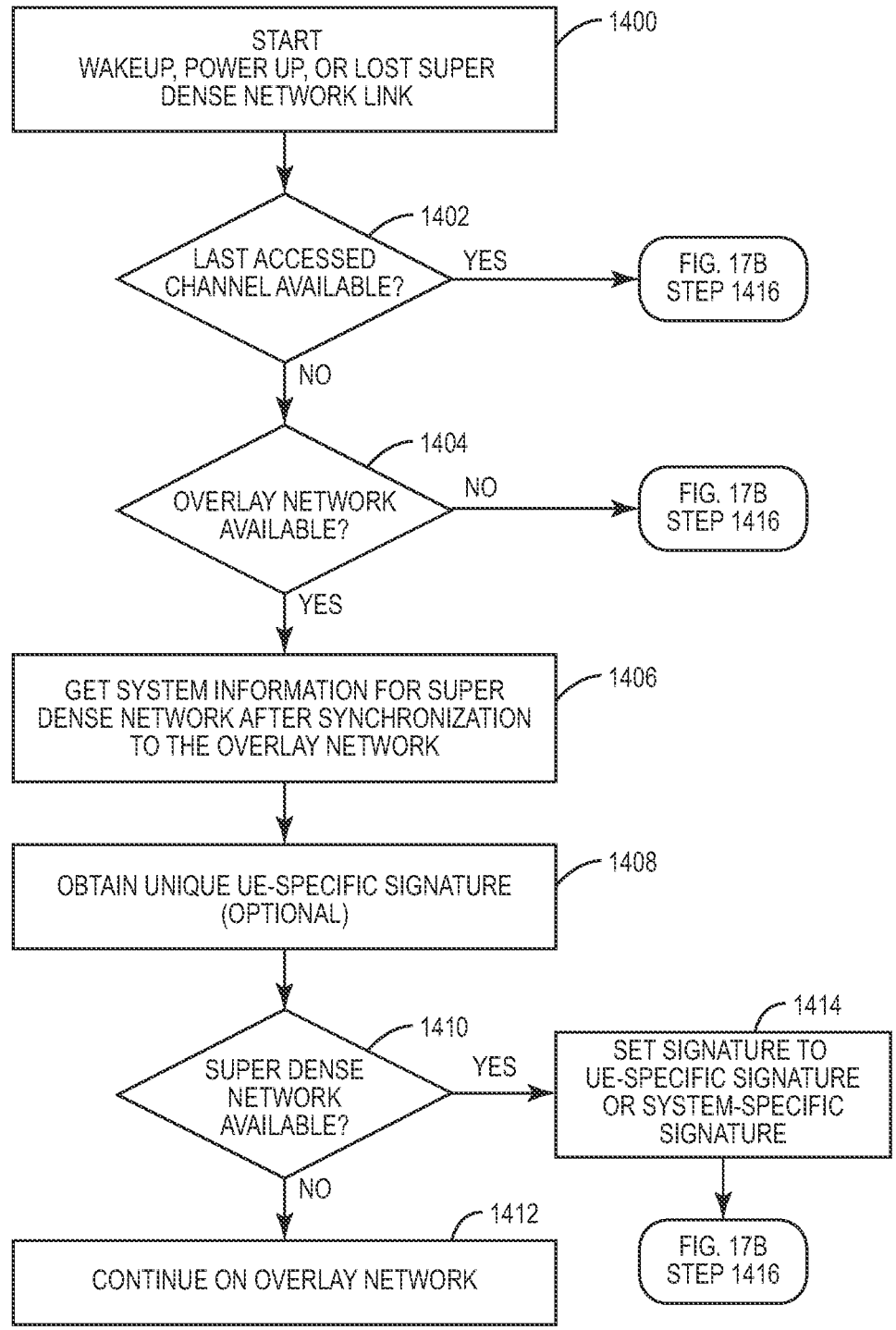
FIGS. 17A and 17B illustrate the operation of one of the UEs of FIG. 16 according to one embodiment of the present disclosure.
Figure 17B:
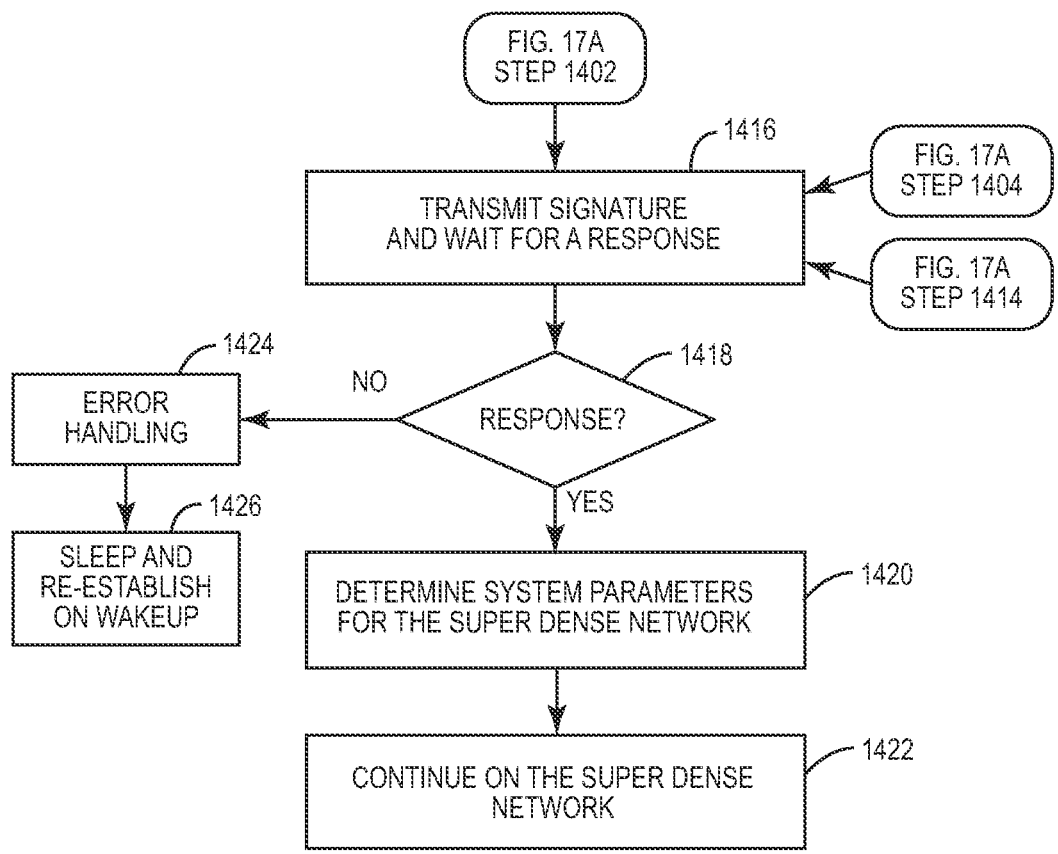

FIGS. 17A and 17B illustrate the operation of the UE 32 of FIG. 16 according to one embodiment of the present disclosure. The UE 32 starts in the deep sleep state and transitions out of the deep sleep state in response to a wakeup signal, a power up, or the loss of network connectivity to the super dense network 20 (step 1400). For convenience, each of these conditions will be referred to as a wakeup condition. Upon waking up, the UE 32 determines whether the last accessed channel, if any, to the super dense network 20 is available (step 1402). More specifically, the UE 32 stores a list of channels to the super dense network 20 that were most recently accessed by the UE 32. The UE 32 then determines whether any of those channels are available. If so, the process proceeds to step 1416, which is discussed below. If not, the UE 32 determines whether the overlay network is available (step 1404). Specifically, the UE 32 listens for a broadcast channel broadcast by the macro base station 22. If the overlay network is not available, the process proceeds to step 1416.

However, if the overlay network is available, then the UE 32 gets system information for the super dense network 20 from the macro base station 22 in the overlay network after synchronization to the overlay network (step 1406). Notably, synchronization to the overlay network may be performed using any suitable synchronization technique such as the synchronization techniques employed in conventional cellular communication networks. The system information may include, for example, channel information and timing correction information. In addition, the UE 32 may obtain a system-specific or UE-specific signature for the super dense network 20 from the macro base station 22 (step 1408).

Next, the UE 32 determines whether the super dense network 20 is available from the system information (step 1410). If not, the UE 32 continues operation on the overlay network (step 1412). However, if the super dense network 20 is available, the UE 32 sets the signature of the UE 32 to either the UE-specific signature or the system-specific signature, depending on the particular embodiment (step 1414). At this point, whether proceeding from step 1402, 1404, or 1414, the UE 32 transmits the signature and waits for a response (step 1416). The UE 32 determines whether a response is received from one of the wireless access nodes 30 (step 1418). If so, the UE 32 determines system parameters for the super dense network 20 (step 1420). These system parameters may include, for example, a secondary UE-specific signature to be used by the UE 32 for the super dense network 20. However, other system parameters may be obtained depending on the particular embodiment. The UE 32 then continues operation on the super dense network 20 (step 1422). Returning to step 1418, if a response is not received, the UE 32 performs a error handling procedure (step 1424) and, optionally, enters the deep sleep state and attempts to re-establish a network connection upon wakeup (step 1426).

Note that, in FIGS. 17A and 17B, the UE 32 has entered the active state upon wakeup in step 1400. After the network connection is established to the super dense network 20, the UE 32 may continue monitoring for triggering events and adjusting the duty cycle for the DTX/DRX mode of operation accordingly.

Figure 18:
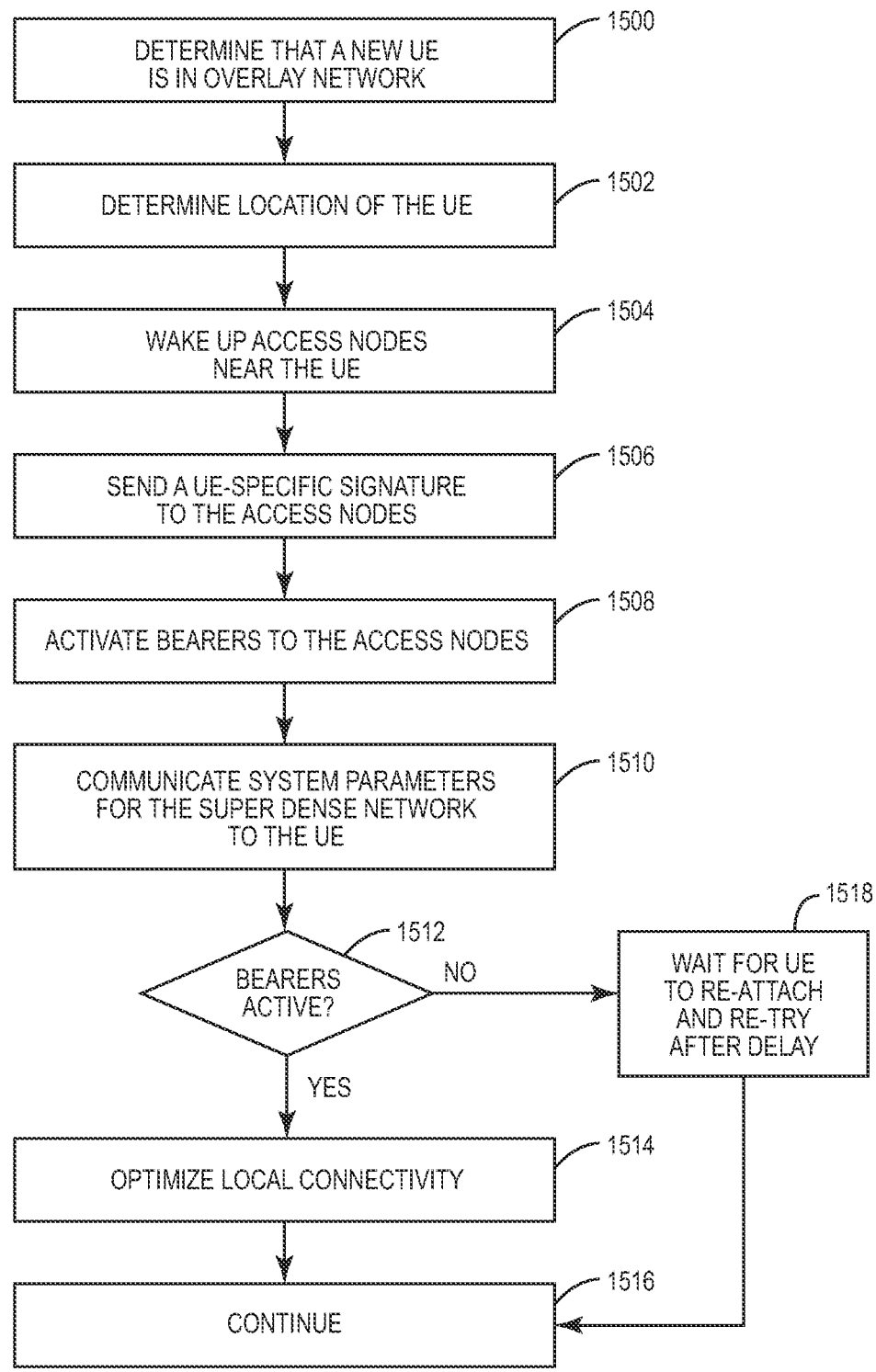
FIG. 18 illustrates the operation of the overlay network of FIG. 16 according to one embodiment of the present disclosure.

FIG. 18 is a flow chart illustrating the operation of the overlay network of FIG. 16 according to one embodiment of the present disclosure. First, the overlay network, and specifically the macro base station 22, determines that a new UE 32 is located in the overlay network (step 1500). The overlay network then determines a location of the UE 32 (step 1502). The location of the UE 32 may be determined using any suitable location determination scheme such as, for example, triangulation using multiple macro base stations 22, a Global Position System (GPS) of the UE 32, or the like. The MME 28 then wakes up one or more of the wireless access nodes 30 near the location of the UE 32 (step 1504). More specifically, the MME 28 sends wakeup signals to the wireless access nodes 30 near the location of the UE 32. For example, the wakeup signals may be sent to the wireless access node 30 that serves a cell that includes the location determined for the UE 32 in step 1502 and, optionally, one or more neighboring wireless access nodes 30 of that wireless access node 30. The wakeup signals may be such that the wireless access nodes 30 near the location of the UE 32 all transition to the active state. Alternatively, if the location of the UE 32 is sufficiently accurate, the wakeup signal to the wireless access node 30 serving the cell in which the UE 32 is located is such that that wireless access node 30 transitions to the active state. In contrast, the wakeup signals to the neighboring wireless access nodes 30 may be such that the neighboring wireless access nodes 30 transition to an intermediate alertness state. Optionally, the MME 28 sends a UE-specific signature for the UE 32 to the wireless access nodes 30 near the location of the UE 32 (step 1506).

Next, the MME 28 activates bearers from the transport network to the wireless access nodes 30 near the location of the UE 32 (step 1508). The overlay network then communicates system parameters for the super dense network 20 to the UE 32 via the macro base station 22 (step 1510). The system parameters include channel information and timing correction information. In addition, the system parameters may include the UE-specific signature for the UE 32. The overlay network then determines whether the bearers to the wireless access nodes 30 are active (step 1512). If so, the MME 28 optimizes local connectivity for the UE 32 (step 1514). More specifically, the MME 28 activates new wireless access nodes 30 and/or deactivates wireless access nodes 30 based on the activity of the bearers in order to optimize connectivity for the UE 32. At this point, connectivity of the UE 32 to the super dense network 20 has been established, and operation continues in the normal manner (step 1516). Returning to step 1512, if the bearers are not active, the overlay network waits for the UE 32 to re-attach and re-try after a delay (step 1518). Once the UE 32 has successfully connected to the super dense network 20, the process proceeds to step 1516.

Figure 19A:
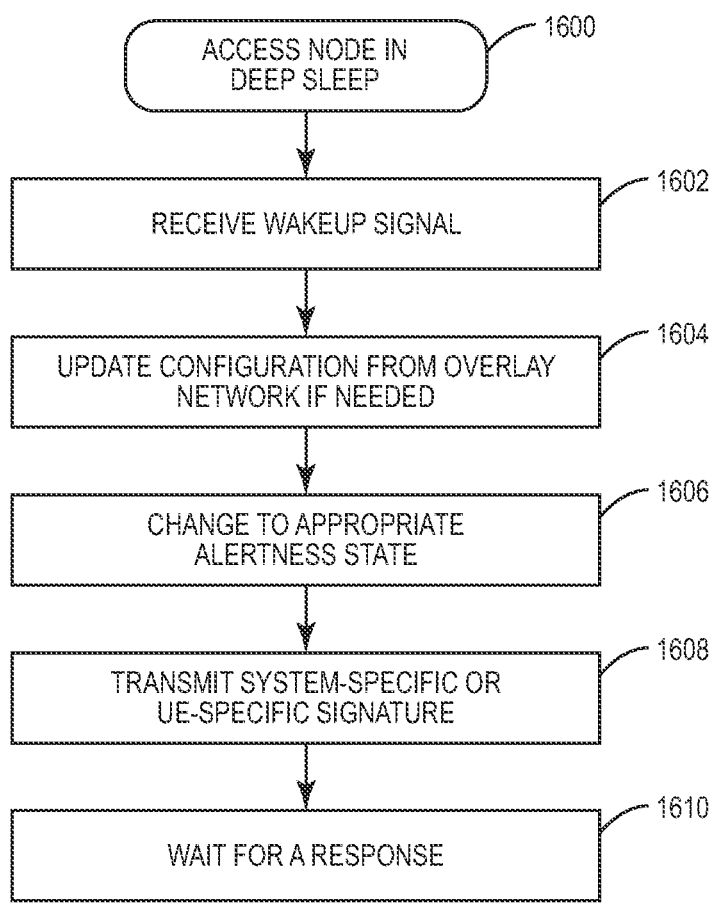
FIGS. 19A through 19C illustrate the operation of one of the wireless access nodes of FIG. 16 according to one embodiment of the present disclosure.
Figure 19B:
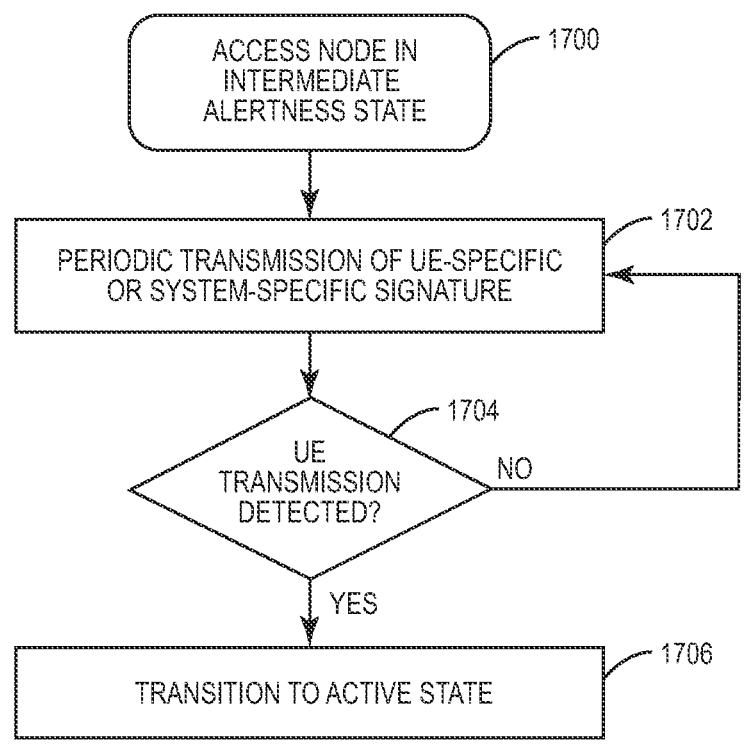
Figure 19C:
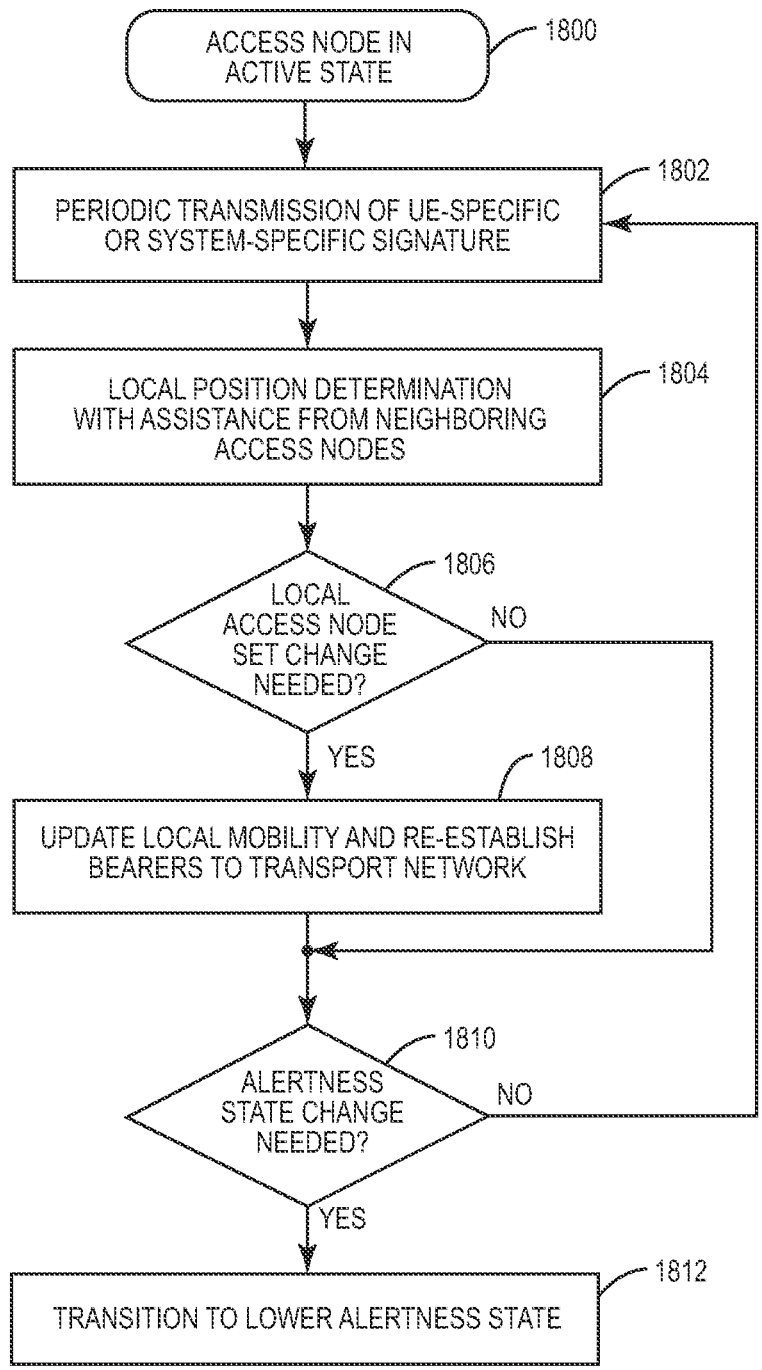

FIGS. 19A through 19C are flow charts that illustrate the operation of one of the wireless access nodes 30 in the super dense network 20 of FIG. 16 according to one embodiment of the present disclosure. More specifically, FIG. 19A illustrates the operation of the wireless access node 30 when transitioning from the deep sleep state to a higher alertness state according to one embodiment of the present disclosure. The process begins with the wireless access node 30 in the deep sleep state (step 1600). At some point, the wireless access node 30 receives a wakeup signal from the overlay network (step 1602). In response, the wireless access nodes 30 updates its configuration from the overlay network, if needed, (step 1604) and changes to the appropriate alertness state (step 1606). The wireless access node 30 then transmits a system-specific signature or a UE-specific signature depending on the particular embodiment (step 1608). The transmitted signature is the signature received from the overlay network in step 1506 of FIG. 18. The wireless access node 30 then waits for a response (step 1610). Notably, steps 1608 and 1610 may be repeated periodically according to the DTX/DRX duty cycle for the alertness state of the wireless access node 30.

FIG. 19B illustrates the operation of the wireless access node 30 when in an intermediate alertness state according to one embodiment of the present disclosure. The process begins with the wireless access node 30 in an intermediate alertness state (step 1700). The wireless access node 30 periodically transmits the UE-specific signature or the system-specific signature provided to the wireless access node 30 in step 1506 of FIG. 18 (step 1702) and determines whether a response from a UE 32 is received (step 1704). If not, the process returns to step 1702 and is repeated. Notably, steps 1702 and 1704 are performed in the DTX and DRX active intervals for the DTX/DRX mode of operation for the wireless access node 30 at the duty cycle for the alertness state of the wireless access node 30. Once a response is received, the wireless access node 30 transitions to the active state (step 1706).

FIG. 19C illustrates the operation of the wireless access node 30 when in the active state according to one embodiment of the present disclosure. The process begins with the wireless access node 30 in the active state (step 1800). The wireless access node 30 performs a periodic transmission of the UE-specific or system-specific signature (step 1802). This periodic transmission is performed at the duty cycle for the DTX/DRX mode of operation for the active state of the wireless access node 30. A local position determination process is performed with the assistance from the neighboring wireless access nodes 30 to more accurately determine the location of the UE 32 (step 1804). A determination is then made as to whether a change to a local access node defined to serve the UE 32 is needed (step 1806). If a change to the local access node set for the UE 32 is not needed, the process proceeds to step 1810. Otherwise, if a change is needed, a local mobility for the UE 32 is updated and bearers to the wireless access nodes 30 defined for the UE 32 after the update are re-established (step 1808). Note that steps 1804 through 1808 may be performed by the wireless access node 30 or by another network entity (e.g., the MME 28).

Next, whether proceeding from step 1806 or 1808, the wireless access node 30 determines whether an alertness change is needed (step 1810). For example, if the local mobility update results in the wireless access node 30 being changed from a wireless access node 30 that serves the cell in which the UE 32 is located to a wireless access node 30 that serves a cell that neighbors the cell in which the UE 32 is located, then a determination may be made to decrease the alertness state of the wireless access node 30. If a change in the alertness state is not needed, the process returns to step 1802. If a change in the alertness state is needed, the wireless access node 30 transitions to a lower alertness state (step 1812).

Figure 20:
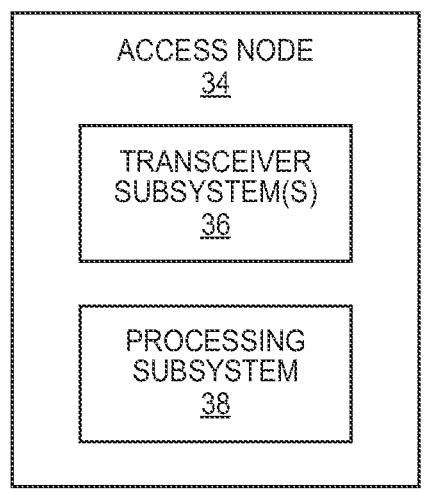
FIG. 20 is a block diagram of a wireless access node according to one embodiment of the present disclosure.

FIG. 20 is a block diagram of a wireless access node 34 according to one embodiment of the present disclosure. The wireless access node 34 is either one of the wireless access nodes 12 of FIG. 1 or one of the wireless access nodes 30 of FIG. 16. As illustrated, the wireless access node 34 includes one or more transceiver subsystems 36 and a processing subsystem 38. One of the one or more transceiver subsystems 36 generally includes analog and, in some embodiments, digital components for sending and receiving data to and from UEs within the cell of the wireless access node 34. In addition, the one or more transceiver subsystems 36 may include one or more additional transceiver subsystems 36 for sending data to or receiving data from other wireless access nodes 34 and/or sending data to and receiving data from an overlay network such as that in FIG. 16. From a wireless communications protocol view, the one or more transceiver subsystems 36 implement at least part of Layer 1 (i.e., the Physical or "PHY" Layer). The processing subsystem 38 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the one or more transceiver subsystems 36 and the processing subsystem 38, will vary depending on both the particular implementation as well as the standard or standards supported by the wireless access node 34.

Figure 21:
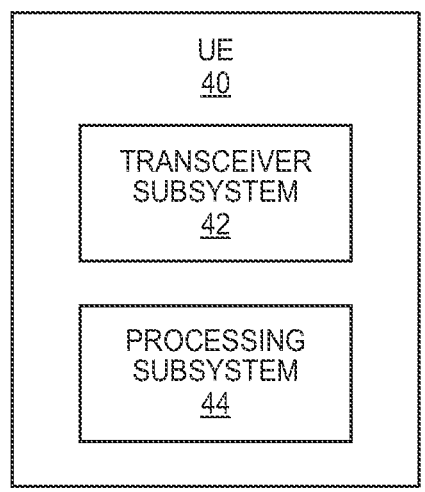
FIG. 21 is a block diagram of a UE according to one embodiment of the present disclosure.

FIG. 21 is a block diagram of a UE 40 according to one embodiment of the present disclosure. The UE 40 is either one of the UEs 16 of FIG. 1 or one of the UEs 32 of FIG. 16. As illustrated, the UE 40 includes a transceiver subsystem 42 and a processing subsystem 44. The transceiver subsystem 42 generally includes analog and, in some embodiments, digital components for sending and receiving data to and from the wireless access nodes 12, 30 and, in the embodiment of FIG. 16, the macro base stations 22 in the overlay network. From a wireless communications protocol view, the transceiver subsystem 42 implements at least part of Layer 1 (i.e., the Physical or "PHY" Layer). The processing subsystem 44 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 42 and the processing subsystem 44, will vary depending on both the particular implementation as well as the standard or standards supported by the UE 40.

Those skilled in the art will appreciate that the block diagrams of the wireless access node 34 and the UE 40 in FIGS. 20 and 21 necessarily omit numerous features that are not necessary to a complete understanding of this disclosure. For instance, although all of the details of the processing subsystems 38 and 44 are not illustrated, those skilled in the art will recognize that the processing subsystems 38 and 44 comprise one or several general-purpose or special-purpose microprocessors or other microcontrollers programmed with suitable software and/or firmware to carry out some or all of the functionality of the wireless access node 34 and the UE 40 described herein. In addition or alternatively, the processing subsystems 38 and 44 may comprise various digital hardware blocks (e.g., one or more Application Specific Integrated Circuits (ASICs), one or more off-the-shelf digital and analog hardware components, or a combination thereof) configured to carry out some or all of the functionality of the wireless access node 34 and the UE 40 described herein.

The following acronyms are used throughout this disclosure.

ASIC Application Specific Integrated Circuit
DRX Discontinuous Receive
DTX Discontinuous Transmit
FDD Frequency Division Duplex
GPS Global Positioning System
H-FDD Half-Duplex Frequency-Division Duplex
LTE Long Term Evolution
MME Mobility Management Entity
MMS Multimedia Messaging Service
PDN-GW Packet Data Network Gateway
RFID Radio Frequency Identification
S-GW Serving Gateway
TDD Time Division Duplex
UE User Equipment Device Those skilled in the art will recognize improvements and modifications to the preferred embodiments of the present disclosure. All such improvements and modifications are considered within the scope of the concepts disclosed herein and the claims that follow.

What is claimed is:

1. A method of operation of a wireless access node in a dense deployment of wireless access nodes in a cellular communication network comprising:
    operating a transmitter and a receiver of the wireless access node according to a discontinuous transmit and discontinuous receive, DTX/DRX, mode of operation, wherein a plurality of duty cycles are predefined for the DTX/DRX mode of operation and each duty cycle of the plurality of duty cycles is assigned to one or more of a plurality of alertness states;
    changing an alertness state of the wireless access node from a select one of the plurality of alertness states for the wireless access node to a different one of the plurality of alertness states;
    changing a common duty cycle for both an active transmit interval and an active receive interval for the DTX/DRX mode of operation to the duty cycle assigned to the different one of the plurality of alertness states in response to changing the alertness state of the wireless access node from the select one of the plurality of alertness states to the different one of the plurality of alertness states.

2. The method of claim 1 wherein each alertness state of the plurality of alertness states has a predefined duty cycle for the DTX/DRX mode of operation.

3. The method of claim 1 wherein the wireless access node is connected to an overlay network.

4. A method of operation of a wireless access node in a dense deployment of wireless access nodes in a cellular communication network comprising:
    operating a transmitter and a receiver of the wireless access node according to a discontinuous transmit and discontinuous receive, DTX/DRX, mode of operation;
    changing an alertness state of the wireless access node from a select one of a plurality of alertness states to a different one of the plurality of alertness states in response to an occurrence of a triggering event;
    changing one or more duty cycles for the DTX/DRX mode of operation in response to changing the alertness state of the wireless access node;
    wherein the triggering event is an event selected from a group consisting of: a network request, a request from a neighboring wireless access node in the dense deployment of wireless access nodes in the cellular communication network, a request from a user equipment device, or detection of a user equipment device in a vicinity of the wireless access node.

5. The method of claim 4 wherein the triggering event is a network request from an overlay network.

6. The method of claim 4 wherein:
    the triggering event indicates that the user equipment device is an active user equipment device within a cell served by the wireless access node;

changing the alertness state of the wireless access node from the select one of the plurality of alertness states to the different one of the plurality of alertness states comprises changing the alertness state of the wireless access node to a maximum alertness state of the plurality of alertness states for the wireless access node in response to the triggering event; and changing the one or more duty cycles for the DTX/DRX mode of operation comprises changing the one or more duty cycles for the DTX/DRX mode of operation to a maximum duty cycle for the DTX/DRX mode of operation in response to changing the alertness state of the wireless access node.

7. The method of claim 4 wherein:

the triggering event indicates that the user equipment device is an inactive user equipment device within a cell served by the wireless access node;

changing the alertness state of the wireless access node from the select one of the plurality of alertness states to the different one of the plurality of alertness states comprises changing the alertness state of the wireless access node to an intermediate alertness state of the plurality of alertness states for the wireless access node in response to the triggering event; and changing the one or more duty cycles for the DTX/DRX mode of operation comprises changing the one or more duty cycles for the DTX/DRX mode of operation to one or more corresponding intermediate duty cycles for the DTX/DRX mode of operation in response to changing the alertness state of the wireless access node.

8. The method of claim 4 wherein:

the triggering event indicates that the user equipment device is an active user equipment device within a cell served by a neighboring wireless access node in the dense deployment of wireless access nodes in the cellular communication network;

changing the alertness state of the wireless access node from the select one of the plurality of alertness states to the different one of the plurality of alertness states comprises changing the alertness state of the wireless access node to an intermediate alertness state of the plurality of alertness states for the wireless access node in response to the triggering event; and changing the one or more duty cycles for the DTX/DRX mode of operation comprises changing the one or more duty cycles for the DTX/DRX mode of operation to one or more corresponding intermediate duty cycles for the DTX/DRX mode of operation in response to changing the alertness state of the wireless access node.

9. A method of operation of a wireless access node in a dense deployment of wireless access nodes in a cellular communication network comprising:

operating a transmitter and a receiver of the wireless access node according to a discontinuous transmit and discontinuous receive, DTX/DRX, mode of operation, the DTX/DRX mode of operation defining a plurality of active transmit intervals and a plurality of active receive intervals; and controlling one of a group consisting of: a duty cycle of the plurality of active transmit intervals, a duty cycle of the plurality of active receive intervals, and a common duty cycle of the plurality of active transmit intervals and the plurality of active receive intervals based on an alertness state of the wireless access node;

wherein the DTX/DRX mode of operation defines a plurality of DTX/DRX cycles where each of the plurality of DTX/DRX cycles comprises one of the plurality of active transmit intervals and one of the plurality of active receive intervals that are adjacent in time.

10. The method of claim 9 wherein at least a subset of the plurality of active transmit intervals for the wireless access node are time-aligned with corresponding active receive intervals of a user equipment device located within a cell served by the wireless access node, and at least a subset of the plurality of active receive intervals for the wireless access node are time-aligned with corresponding active transmit intervals of the user equipment device located within the cell served by the wireless access node.

11. The method of claim 9:

the active transmit intervals of at least a subset of the plurality of discontinuous transmit and discontinuous receive cycles are time-aligned with corresponding active receive intervals of a user equipment device located within a cell served by the wireless access node; and the active receive intervals of the at least a subset of the plurality of discontinuous transmit and discontinuous receive cycles for the wireless access node are time-aligned with corresponding active transmit intervals of the user equipment device located within the cell served by the wireless access node.

12. A method of operation of a wireless access node in a dense deployment of wireless access nodes in a cellular communication network comprising:

operating a transmitter and a receiver of the wireless access node according to a discontinuous transmit and discontinuous receive, DTX/DRX, mode of operation, the DTX/DRX mode of operation defining a plurality of active transmit intervals and a plurality of active receive intervals; and controlling one or more duty cycles for the DTX/DRX mode of operation based on an alertness state of the wireless access node;

wherein the DTX/DRX mode of operation defines a plurality of DTX/DRX cycles where each of the plurality of DTX/DRX cycles comprises one of the plurality of active transmit intervals and one of the plurality of active receive intervals that are simultaneous in time and use different frequencies.

13. The method of claim 12 wherein at least a subset of the plurality of discontinuous transmit and discontinuous receive cycles are time and frequency aligned with corresponding discontinuous transmit and discontinuous receive cycles of a user equipment device located within a cell served by the wireless access node.

14. A wireless access node in a dense deployment of wireless access nodes in a cellular communication network comprising:

a transceiver subsystem comprising a transmitter and a receiver; and a processing subsystem associated with the transceiver subsystem and adapted to:

operate the transmitter and the receiver of the wireless access node according to a discontinuous transmit and discontinuous receive, DTX/DRX, mode of operation;

change an alertness state of the wireless access node from a select one of a plurality of alertness states to a different one of the plurality of alertness states;

change a common duty cycle for both an active transmit interval for the DTX/DRX mode of operation and an active receive interval for the DTX/DRX mode of operation for the DTX/DRX mode of operation to the duty cycle assigned to the different one of the plurality of alertness states in response to changing the alertness state of the wireless access.

15. A method of operation of a user equipment device in a cellular communication network comprising:
 operating a transmitter and a receiver of the user equipment device according to a discontinuous transmit and discontinuous receive, DTX/DRX, mode of operation, the DTX/DRX mode of operation defining a plurality of active transmit intervals and a plurality of active receive intervals; and
 controlling one or more duty cycles for the DTX/DRX mode of operation based on an alertness state of the user equipment device;
 wherein:
 the DTX/DRX mode of operation defines a plurality of DTX/DRX cycles where each of the plurality of DTX/DRX cycles comprises one of the plurality of active transmit intervals and one of the plurality of active receive intervals that are adjacent in time;
 the active transmit intervals of at least a subset of the plurality of DTX/DRX cycles are time-aligned with corresponding active receive intervals of a wireless access node serving a cell in a dense deployment of wireless access nodes in the cellular communication network in which the user equipment device is located; and
 the active receive intervals of the at least a subset of the plurality of DTX/DRX cycles for the wireless access node are time-aligned with corresponding active transmit intervals of the wireless access node serving the cell in the cellular communication network in which the user equipment device is located.

16. A method of operation of a user equipment device in a cellular communication network comprising:
 operating a transmitter and a receiver of the user equipment device according to a discontinuous transmit and discontinuous receive, DTX/DRX, mode of operation, the DTX/DRX mode of operation defining a plurality of active transmit intervals and a plurality of active receive intervals; and
 controlling one or more duty cycles for the DTX/DRX mode of operation based on an alertness state of the user equipment device;
 wherein:
 the DTX/DRX mode of operation defines a plurality of DTX/DRX cycles where each of the plurality of DTX/DRX cycles comprises one of the plurality of active transmit intervals and one of the plurality of active receive intervals that are simultaneous in time and use different frequencies; and
 at least a subset of the plurality of DTX/DRX cycles are time and frequency aligned with corresponding DTX/DRX cycles of a wireless access node serving a cell in a dense deployment of wireless access nodes in the cellular communication network in which the user equipment device is located.

17. A user equipment device comprising:
 a transceiver subsystem comprising a transmitter and a receiver that enable communication with wireless access nodes in a dense deployment of wireless access nodes in a cellular communication network; and
 a processing subsystem associated with the transceiver subsystem and adapted to:
  operate a transmitter and a receiver of the user equipment device according to a discontinuous transmit and discontinuous receive, DTX/DRX, mode of operation, the DTX/DRX mode of operation defining a plurality of active transmit intervals and a plurality of active receive intervals; and
  control one or more duty cycles for the DTX/DRX mode of operation based on an alertness state of the user equipment device;
 wherein:
 the DTX/DRX mode of operation defines a plurality of DTX/DRX cycles where each of the plurality of DTX/DRX cycles comprises one of the plurality of active transmit intervals and one of the plurality of active receive intervals that are adjacent in time;
 the active transmit intervals of at least a subset of the plurality of DTX/DRX cycles are time-aligned with corresponding active receive intervals of a wireless access node serving a cell in the cellular communication network in which the user equipment device is located; and
 the active receive intervals of the at least a subset of the plurality of DTX/DRX cycles for the wireless access node are time-aligned with corresponding active transmit intervals of the wireless access node serving the cell in the cellular communication network in which the user equipment device is located.

18. A user equipment device comprising:
 a transceiver subsystem comprising a transmitter and a receiver that enable communication with wireless access nodes in a dense deployment of wireless access nodes in a cellular communication network; and
 a processing subsystem associated with the transceiver subsystem and adapted to:
  operate a transmitter and a receiver of the user equipment device according to a discontinuous transmit and discontinuous receive, DTX/DRX, mode of operation, the DTX/DRX mode of operation a plurality of active transmit intervals and a plurality of active receive intervals; and
  control one or more duty cycles for the DTX/DRX mode of operation based on an alertness state of the user equipment device;
 wherein:
 the DTX/DRX mode of operation defines a plurality of DTX/DRX cycles where each of the plurality of DTX/DRX cycles comprises one of the plurality of active transmit intervals and one of the plurality of active receive intervals that are simultaneous in time and use different frequencies; and
 at least a subset of the plurality of DTX/DRX cycles are time and frequency aligned with corresponding DTX/DRX cycles of a wireless access node serving a cell in the cellular communication network in which the user equipment device is located.

* * * * *

UNITED STATES PATENT AND TRADEMARK OFFICE
CERTIFICATE OF CORRECTION

PATENT NO. : 9,014,070 B2  
APPLICATION NO. : 13/302767  
DATED : April 21, 2015  
INVENTOR(S) : Guey et al.

Page 1 of 1

It is certified that error appears in the above-identified patent and that said Letters Patent is hereby corrected as shown below:

In the Specification

In Column 3, Line 3, delete "2C and 2C" and insert -- 2C and 2D --, therefor.

Signed and Sealed this  
Eleventh Day of August, 2015

Michelle K. Lee  
*Director of the United States Patent and Trademark Office*